(12) United States Patent
Petrosso et al.

(10) Patent No.: US 11,727,328 B2
(45) Date of Patent: Aug. 15, 2023

(54) MACHINE LEARNING SYSTEMS AND METHODS FOR PREDICTIVE ENGAGEMENT

(71) Applicant: Job Market Maker, LLC, Charleston, SC (US)

(72) Inventors: Christina R. Petrosso, Foily Beach, SC (US); Joseph W. Hanna, Charleston, SC (US); Nicholas Castro, North Charleston, SC (US); David Trachtenberg, Charleston, SC (US)

(73) Assignee: MAGNIT JMM, LLC, Charleston, SC (US)

( * ) Notice: Subject to any disclaimer, the term of this patent is extended or adjusted under 35 U.S.C. 154(b) by 6 days.

(21) Appl. No.: 17/063,263

(22) Filed: Oct. 5, 2020

(65) Prior Publication Data

US 2021/0103876 A1 Apr. 8, 2021

Related U.S. Application Data

(60) Provisional application No. 62/910,644, filed on Oct. 4, 2019.

(51) Int. Cl.
*G06Q 10/1053* (2023.01)
*G06N 20/20* (2019.01)
(Continued)

(52) U.S. Cl.
CPC . *G06Q 10/063112* (2013.01); *G06F 18/2148* (2023.01); *G06F 40/56* (2020.01); *G06N 20/20* (2019.01); *G06Q 10/1053* (2013.01)

(58) Field of Classification Search
None
See application file for complete search history.

(56) References Cited

U.S. PATENT DOCUMENTS

| 7,797,725 B2 | 9/2010 | Lunt |
| 8,799,039 B2 | 8/2014 | Cullen, III |

(Continued)

FOREIGN PATENT DOCUMENTS

| CN | 108335041 A | 7/2018 |
| WO | 2004061740 A1 | 7/2004 |
| WO | 2010011652 A1 | 1/2010 |

OTHER PUBLICATIONS

International Search Report & Written Opinion dated Jan. 26, 2021 for International Patent Application No. PCT/US20/54270.

(Continued)

*Primary Examiner* — Folashade Anderson
(74) *Attorney, Agent, or Firm* — Husch Blackwell LLP; Bryan D. Stewart; Yikai Chen

(57) ABSTRACT

A machine learning (ML) process can include teaching, with a teaching set, a first ML algorithm to generate one or more machine-predicted results. One or more weights can be generated based on the one or more machine-predicted results and the teaching set. A second ML algorithm can be generated based on the one or more weights. Via the second ML algorithm, one or more machine-learned results can be generated. A description of one or more candidates can be received. Based on the one or more machine-learned results, a respective likelihood of interest in a CCG class of positions for each of the one or more candidates can be generated. A respective communication can be transmitted to each of a subset of the one or more candidates open to the respective likelihood of interest in the CCG class of positions for the subset above a threshold.

18 Claims, 4 Drawing Sheets

(51) Int. Cl.
*G06Q 10/0631* (2023.01)
*G06F 40/56* (2020.01)
*G06F 18/214* (2023.01)

(56) References Cited

U.S. PATENT DOCUMENTS

| | | | |
|---|---|---|---|
| 9,842,312 B1 | 12/2017 | Rosati | |
| 10,223,671 B1 | 3/2019 | Toomey | |
| 10,402,757 B1 | 8/2019 | Shah | |
| 11,080,626 B2* | 8/2021 | Branagh | G06Q 10/1053 |
| 11,163,810 B2* | 11/2021 | Kube | G06F 16/3334 |
| 2002/0099580 A1 | 7/2002 | Eicher | |
| 2003/0028393 A1 | 2/2003 | Coulston | |
| 2003/0208434 A1 | 11/2003 | Posner | |
| 2004/0267606 A1 | 12/2004 | Brishke | |
| 2005/0010467 A1 | 1/2005 | Dietz | |
| 2005/0114279 A1 | 5/2005 | Scarborough et al. | |
| 2005/0246299 A1 | 11/2005 | Scarborough et al. | |
| 2006/0031109 A1 | 2/2006 | Larue | |
| 2006/0167896 A1 | 7/2006 | Kapur | |
| 2006/0229896 A1 | 10/2006 | Rosen | |
| 2007/0033060 A1 | 2/2007 | Goplan | |
| 2008/0065467 A1 | 3/2008 | Nyegaard | |
| 2008/0120152 A1 | 5/2008 | Mccrea | |
| 2008/0208907 A1 | 8/2008 | Tolve | |
| 2009/0164291 A1 | 6/2009 | Shah | |
| 2009/0307052 A1 | 12/2009 | Mankani | |
| 2010/0169143 A1 | 7/2010 | Carr | |
| 2011/0125622 A1 | 5/2011 | Mccrea | |
| 2011/0131146 A1 | 6/2011 | Skutnik | |
| 2012/0215711 A1 | 8/2012 | Brief | |
| 2013/0046704 A1* | 2/2013 | Patwa | G06Q 10/06 705/321 |
| 2013/0085954 A1 | 4/2013 | Hanneman | |
| 2013/0325540 A1 | 12/2013 | Shi | |
| 2014/0089216 A1 | 3/2014 | Costa | |
| 2014/0122355 A1* | 5/2014 | Hardtke | G06Q 10/1053 705/321 |
| 2014/0136438 A1 | 5/2014 | Barnett | |
| 2014/0297550 A1 | 10/2014 | Miller | |
| 2015/0025329 A1 | 1/2015 | Amarasingham | |
| 2015/0032654 A1 | 1/2015 | Huff | |
| 2015/0127567 A1 | 5/2015 | Menon | |
| 2015/0186846 A1 | 7/2015 | Menon | |
| 2015/0186847 A1 | 7/2015 | Menon | |
| 2015/0220884 A1* | 8/2015 | Kabdebon | G06Q 10/1053 705/321 |
| 2016/0026347 A1 | 1/2016 | Gehring | |
| 2016/0125360 A1 | 5/2016 | Ali | |
| 2016/0350425 A1* | 12/2016 | Tripathi | G06F 16/9535 |
| 2017/0011313 A1 | 1/2017 | Pochert | |
| 2017/0011325 A1* | 1/2017 | Hanna | G06Q 10/1053 |
| 2017/0039508 A1 | 2/2017 | French | |
| 2017/0132571 A1 | 5/2017 | Stock | |
| 2017/0316361 A1 | 11/2017 | Jagota | |
| 2017/0357945 A1* | 12/2017 | Ashkenazi | G06Q 10/1053 |
| 2018/0096307 A1 | 4/2018 | Fortier | |
| 2018/0232683 A1 | 8/2018 | Chuang | |
| 2018/0232703 A1 | 8/2018 | Chuang | |
| 2018/0232704 A1 | 8/2018 | Porter | |
| 2018/0336528 A1 | 11/2018 | Carpenter | |
| 2019/0019159 A1 | 1/2019 | Champaneria | |
| 2019/0019160 A1 | 1/2019 | Champaneria | |
| 2019/0050813 A1* | 2/2019 | Guo | G06Q 10/1053 |
| 2019/0180300 A1 | 6/2019 | Weston | |
| 2019/0197487 A1* | 6/2019 | Jersin | H04L 51/02 |
| 2019/0213522 A1 | 7/2019 | Cong | |
| 2019/0317966 A1* | 10/2019 | Qin | G06F 40/30 |
| 2020/0005243 A1 | 1/2020 | Pong | |
| 2020/0034357 A1 | 1/2020 | Panuganty | |
| 2020/0065772 A1* | 2/2020 | Whitehead | G06Q 10/1053 |
| 2020/0117490 A1 | 4/2020 | Sengupta | |
| 2020/0134243 A1 | 4/2020 | Vardi | |
| 2020/0302370 A1* | 9/2020 | Mathiesen | G06N 20/00 |
| 2020/0402015 A1* | 12/2020 | Ozcaglar | G06F 16/906 |
| 2022/0198562 A1* | 6/2022 | Celia | G06Q 40/04 |

OTHER PUBLICATIONS

Shreya Gupta, Radar Chart, its Applications and Limitations, Sep. 15, 2012; 2 pages (Year: 2012).
Tadas Baltrusaitis et al., Multimodal Machine LEarning: a Survey and Taxonomy, Aug. 1, 2017 (Year: 2017).
International Search Report and Written Opinion dated Jan. 29, 2020 for international PCT patent application No. PCT/US19/61766.
International Search Report and Written Opinion dated Nov. 4, 2019 for international PCT patent application No. PCT/US19/47939.
International Preliminary Report on Patentability dated Sep. 22, 2020 for international PCT patent application No. PCT/US 19/47939.
International Preliminary Report on Patentability dated Jan. 15, 2021 for international PCT patent application No. PCT/US19/49910.
International Search Report and Written Opinion dated Dec. 10, 2019 or international PCT patent application No. PCT/US19/49910.
Advanced Partners, Staffing Profitability Calculator, Apr. 19, 2018, http://www.advancepartners.com/staffing-profitability-calculator/, p. 2.
International Search Report & Written Opinion dated Sep. 8, 2021 for International Patent Application No. PCT/US21/36230.
International Search Report & Written Opinion dated Sep. 9, 2021 for International Patent Application No. PCT/US21/36225.
International Search Report & Written Opinion dated Sep. 29, 2021 for International Patent Application No. PCT/US21/36228.

* cited by examiner

MACHINE LEARNING SYSTEMS AND METHODS FOR PREDICTIVE ENGAGEMENT

CROSS-REFERENCE TO RELATED APPLICATIONS

This application claims the benefit of and priority to U.S. Patent Application No. 62/910,644, filed Oct. 4, 2019, entitled "MACHINE LEARNING SYSTEMS AND METHODS FOR PREDICTIVE TARGETING AND ENGAGEMENT," which is incorporated herein by reference in its entirety.

BACKGROUND

Previous approaches to predicting CCG affiliation have relied upon self-identification. However, not all those attracted to CCG-based positions will self-identify, and, of those that do self-identify, terms and phrases used to indicate CCG affiliation can be highly variant and such indications can become invalid over time as an affiliation may change. Furthermore, reliance on self-identification may render previous approaches incapable of predicting whether or not an applicant is likely to respond to communications for CCG-based positions. Accordingly, there exists an unmet need for systems and methods that can more accurately predict non-self-identifying applicants that are of a particular desired status.

BRIEF SUMMARY OF THE DISCLOSURE

Briefly described, and according to one embodiment, aspects of the present disclosure generally relate to systems and methods for evaluating and targeting entities.

In at least on embodiment, the present system is configured to generate predictions, such as a likelihood of a candidate to be interested in contract, contingent, or gig (CCG)-based employment. In various embodiments, the present system may implement various machine learning techniques, natural language generation (NLG) practices, and data normalization processes to analyze data and generate predictions. In one embodiment, the analyzed data may include candidate data, position data, recruitment data, and other information. In at least one embodiment, the predictions may include, but are not limited to, predictions for whether or not a candidate is likely to be a CCG-based position holder, whether or not a candidate is likely to accept a CCG-based position for their next job, and whether or not a candidate is likely to engage with recruitment communications related to CCG-based positions. In one or more embodiments, the natural language generation techniques may include, but are not limited to, processing data and identifying language that is likely to elicit engagement from a candidate when included in candidate communications related to CCG-based positions, and automatically generating communications (or components thereof) based on identified language.

In at least one embodiment, the present system is configured to automatically (or in response to input) collect, retrieve, or access data. In various embodiments, the system is configured to automatically scrape and index publicly accessible data sources to obtain candidate data, position data, recruitment data, and/or other information. In one or more embodiments, the system is configured to automatically access and process candidate data, position data, recruitment data, and/or other information stored in one or more databases operatively connected to the system. In various embodiments, the system retrieves data by processing electronic documents, web pages, and other digital media. In some embodiments, the system processes resumes, position descriptions, online reviews, and other digital media to obtain candidate, position, and/or recruitment data, or other information.

In one or more embodiments, the present system may normalize data, thereby rendering the data more suitable for analysis via machine learning methods and other techniques described herein. In at least one embodiment, the present system may clean and normalize data to remove, impute, or otherwise modify missing, null, or erroneous data values. In various embodiments, the present system may perform entity resolution to disambiguate and correlate any data to be indexed and/or analyzed according to the processes described herein. In at least one embodiment, because companies, recruiters, candidates, and other entities may use disparate terms to refer to similar positions, job titles, and other criteria, performing entity resolution may allow the present system to present a candidate, recruiter, or another user with positions, job titles, and other information that were otherwise unknown or considered irrelevant to thereto.

In one or more embodiments, the present system may include one or more machine learning models. In various embodiments, the present system may iteratively generate, modify, and train machine learning models to perform actions including, but not limited to, predicting whether or not a candidate is likely to be a CCG-based position holder, predicting whether or not a candidate is likely to accept a CCG-based position for their next job, and predicting whether or not a candidate is likely to engage with recruitment communications related to CCG-based positions. In at least one embodiment, predictions generated by one or more machine learning models may be binary (e.g., exemplary predictions being "candidate X is a CCG-based position holder," and "candidate Y is not a CCG-based position holder), or may be correlated to a scale (e.g., exemplary predictions being "candidate X is most likely to be a CCG-based position holder," and candidate Y is less likely to be a CCG-based position holder"). In one or more embodiments, predictions may be formatted as classifications determined and assigned based on comparisons between prediction scores (generated by machine learning models) and prediction thresholds that may be predefined and/or generated according to one or more machine learning models.

In various embodiments, the system may generate or receive training sets for training (also referred to as "teaching") machine learning models. In at least one embodiment, the system may generate or receive CCG status training sets for predicting whether or not, or to what degree, a candidate is likely to be a CCG-based position holder. For example, the system may generate a CCG status training set including data describing both known CCG-based position holders and known non-CCG position holders (e.g., for example, known full-time position holders). In the same example, the system may use the CCG status training set to generate and train one or more machine learning models to accurately and precisely predict a likelihood of a candidate being a current and/or past CCG-based position holder.

In one or more embodiments, the system may generate or receive CCG likelihood training sets for predicting whether or not, or to what degree, a candidate is likely to accept a CCG-based position for their next employment source. For example, the system may generate a CCG likelihood training set including data describing candidates that elected a CCG-based position for their most recent employment source. In the same example, the system may use the CCG likelihood training set to generate and train one or more machine learning models to accurately and precisely predict a likelihood of a candidate accepting a CCG-based position for their next employment source.

In various embodiments, the system may generate or receive CCG engagement training sets for predicting whether or not, or to what degree, a candidate is likely to engage with recruitment communications for CCG-based positions. For example, the system may generate a CCG engagement training set including data describing candidates, historic CCG-related communications, and historic engagement of the candidates with CCG-related recruitment communications. In the same example, the system may use the CCG engagement training set to generate and train one or more machine learning models to accurately and precisely predict a likelihood of a candidate engaging with a CCG-related recruitment communication.

In at least one embodiment, the system may perform NLG and machine learning processes to identify and predict language that is most likely to elicit engagement from one or more candidates. In one or more embodiments, the system may track engagement with transmitted communications to augment NLG processes and generate improved communication language. In various embodiments, the system may perform a first set of machine learning processes to identify candidates most likely to respond to a CCG-related recruitment communication, and may perform a second set of machine learning processes and NLG processes to identify and generate CCG-related communications (or elements thereof) that are most likely to elicit engagement if transmitted to the candidates identified in the first set of machine learning processes.

In one or more embodiments, the present system may be implemented to evaluate current position holders within a company, institution, etc. In at least one embodiment, the system may be used for retention analysis of non-CCG position holders at a company. In various embodiments, the system may be configured to identify, via machine learning methods, a subset of the non-CCG position holders that are likely to accept a CCG-based position for their next employment source. In one or more embodiments, the system may also identify one or more machine learning parameters (e.g., portions of data, information, etc.) that are most influential in determining likelihood of a non-CCG position holder accepting a CCG-based position. In at least one embodiment, the present system may be used to identify and predict trends for supply and demand of non-CCG and CCG-based positions, and identify potential candidates to meet supply and demand trends. For example, an embodiment of the system may be configured to identify, for a particular company, current non-CCG and/or CCG-based position holders that are likely to engage with recruitment communications and accept a position (non-CCG or CCG-based) outside of the particular company for their next employment source. In the same example, the system may also be configured to identify candidates that are, qualified to replace a current non-CCG or CCG-based position holder, likely to be a CCG-based position holder, likely to accept a CCG-based position for their next employment source, and/or likely to engage with CCG-related recruitment communications.

According to a first aspect, a machine learning process comprising: A) teaching, with a teaching set, at least one first machine learning algorithm to generate one or more machine predicted results; B) generating one or more weights based on the one or more machine predicted results and the teaching set; C) generating at least one second machine learning algorithm based on the one or more weights; D) generating, via the at least one second machine learning algorithm, one or more machine-learned results; E) receiving a description of one or more candidates; F) generating a respective likelihood of interest in a CCG class of positions for each of the one or more candidates based on the one or more machine-learned results; and G) generating a respective communication to each of a subset of the one or more candidates open to the respective likelihood of interest in the CCG class of positions for the subset above a threshold.

According to a second aspect, the machine learning process of the first aspect or any other aspect, further comprising: A) receiving a set of candidate parameters for a particular position, the particular position corresponding to the CCG class of positions; and B) processing the set of candidate parameters to identify one or more candidates from a set of candidates that meet the set of candidate parameters.

According to a third aspect, the machine learning process of the second aspect or any other aspect, further comprising: A) generating a ranking of the subset of the one or more candidates based on the respective likelihood of interest in the CCG class of positions; and B) generating a communication based on the ranking of the subset.

According to a fourth aspect, the machine learning process of the first aspect or any other aspect, further comprising: A) generating particular language designed to provoke a response from each of the subset of the one or more candidates; and B) generating one or more strings of text via natural language processing for the respective communication for each of the subset of the one or more candidates, wherein the one or more strings of text comprise language are based on the particular language.

According to a fifth aspect, the machine learning process of the first aspect or any other aspect, wherein the teaching set describes one or more first communications with a known positive result and one or more second communications with a known negative result.

According to a sixth aspect, the machine learning process of the first aspect or any other aspect, or any other claim further comprising: A) receiving an indication that a particular candidate does not prefer the CCG class of positions; B) subsequent to receiving the indication, generating a change in a profile associated with the particular candidate; C) generating that the change in the profile increases a likelihood of interest in the CCG class of positions more than or equal to a threshold amount; and D) in response to the change increasing the likelihood of interest more than or equal to the threshold amount, adjusting the profile to facilitate communication with the particular candidate.

According to a seventh aspect, the machine learning process of the first aspect or any other aspect, wherein the description of the one or more candidates is extracted from at least one of media and investigative information.

According to an eighth aspect, a machine learning system comprising: A) memory comprising a teaching set describing one or more first communications with a known positive result and one or more second communications with a known negative result; and B) at least one device in communication with the memory, the at least one device being configured to: 1) teach, with a teaching set, at least one first machine learning algorithm to generate one or more machine predicted results; 2) analyze one or more weights based on the one or more machine predicted results and the teaching set; 3) generate at least one second machine learning algorithm based on the one or more weights; 4) generate, via the at least one second machine learning algorithm, one or more machine-learned results; and 5) analyze a respective likelihood of interest in a CCG class of positions for each of one or more candidates based on the one or more machine-learned results.

According to a ninth aspect, the machine learning system of the eighth aspect or any other aspect, wherein the at least one device is further configured to exclude any candidates from the one or more candidates that does not meet a predefined threshold.

According to a tenth aspect, the machine learning system of the eighth aspect or any other aspect, wherein the at least one device is further configured to generate a respective communication to each of a subset of the one or more candidates open to the respective likelihood of interest in the CCG class of positions for the subset above a threshold.

According to an eleventh aspect, the machine learning system of the tenth aspect or any other aspect, wherein the at least one device is further configured to: A) analyze a respective result associated with the respective communication for each of the subset of the one or more candidates; and B) transform the teaching set based on the respective result for each of the subset of the one or more candidates.

According to a twelfth aspect, a machine learning system comprising: A) memory; and B) at least one device in communication with the memory, the at least one device being configured to: 1) teach, with a teaching set, at least one first machine learning algorithm to generate one or more machine predicted results; 2) analyze one or more weights based on the one or more machine predicted results and the teaching set; 3) generate at least one second machine learning algorithm based on the one or more weights; 4) generate, via the at least one second machine learning algorithm, one or more machine-learned results; 5) analyze a respective likelihood of interest in a CCG class of positions for each of one or more candidates based on the one or more machine-learned results; and 6) generate a respective communication to each of a subset of the one or more candidates open to the respective likelihood of interest in the CCG class of positions for the subset above a threshold.

According to a thirteenth aspect, the machine learning system of the twelfth aspect or any other aspect, wherein the at least one device is further configured to: A) analyze a respective result associated with the respective communication for each of the subset of the one or more candidates; and B) transform the teaching set based on the respective result for each of the subset of the one or more candidates.

According to a fourteenth aspect, the machine learning system of the thirteenth aspect or any other aspect, wherein the at least one device is further configured to: A) transform, with the transformed teaching set, the at least one first machine learning algorithm to generate a transformed one or more machine predicted results; and B) analyze one or more transformed weights based on the transformed one or more machine predicted results and the transformed teaching set.

According to a fifteenth aspect, the machine learning system of the fourteenth aspect or any other aspect, wherein the at least one device is further configured to: A) generate at least one transformed second machine learning algorithm based on the one or more transformed weights; B) generate, via the at least one transformed second machine learning algorithm, one or more additional machine-learned results; and C) identify a transformed respective likelihood of interest in the CCG class of positions for each of the one or more candidates based on the one or more additional machine-learned results.

According to a sixteenth aspect, the machine learning system of the twelfth aspect or any other aspect, wherein the at least one device is further configured to: A) receive a set of candidate parameters for a particular position, the particular position corresponding to the CCG class of positions; and B) process the set of candidate parameters to identify a candidate subset of the one or more candidates that meets the set of candidate parameters, wherein the subset of the one or more candidates are selected from the candidate subset.

According to a seventeenth aspect, the machine learning system of the twelfth aspect or any other aspect, wherein the at least one device is further configured to: A) receive the respective likelihood of interest in the CCG class of positions for the one or more candidates; B) analyze, for each candidate, if the respective likelihood of interest for a subset of the one or more candidates meets a threshold for a particular position; and C) generate and transmit, to a profile associated with the particular position, a description of the subset of the one or more candidates that meet the threshold.

According to an eighteenth aspect, the machine learning system of the twelfth aspect or any other aspect, wherein the at least one device is further configured to exclude any candidates from the one or more candidates that does not meet a predefined threshold.

These and other aspects, features, and benefits of the claimed systems and methods will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE FIGURES

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
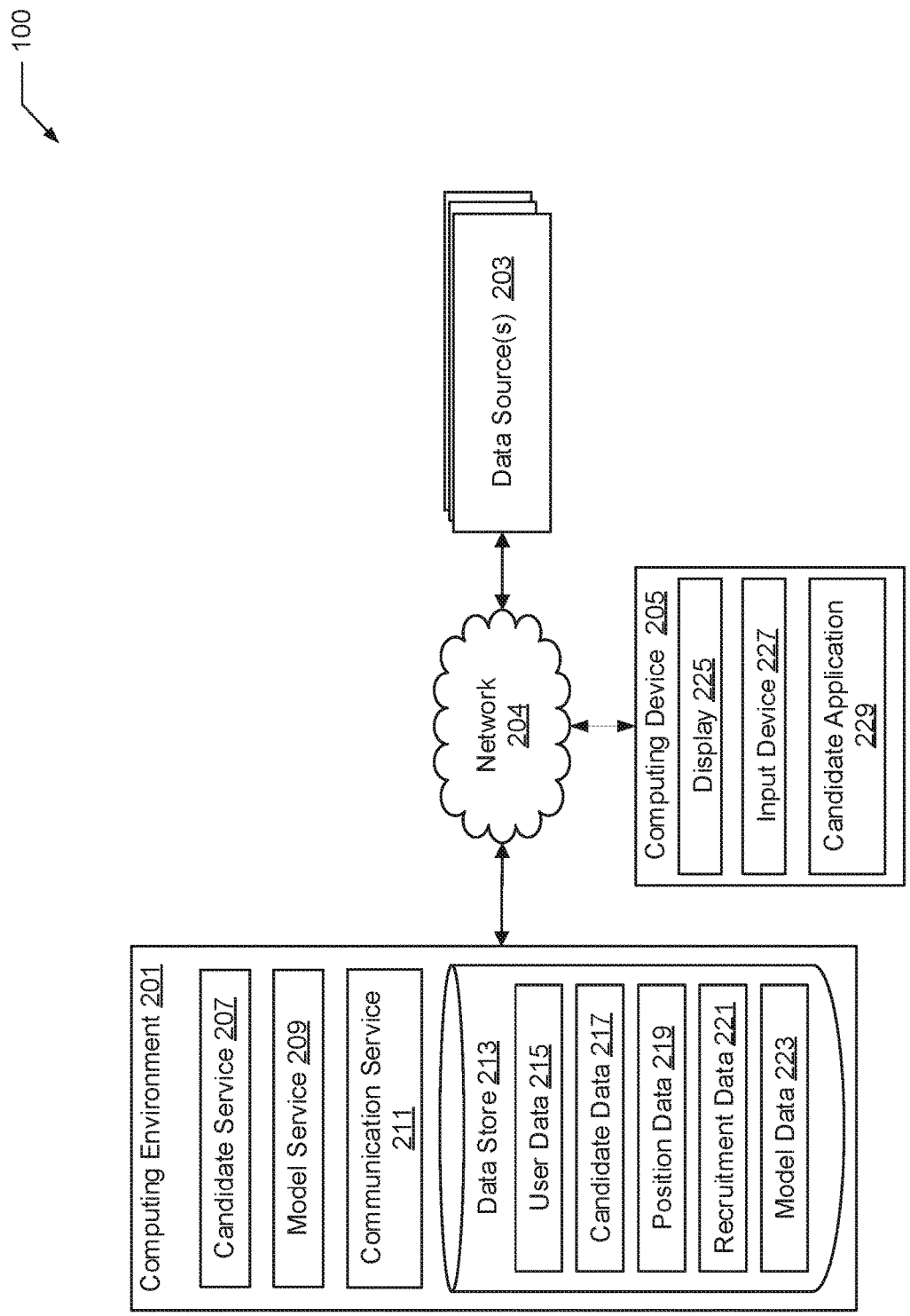
FIG. 1 shows an exemplary targeting system, according to one embodiment of the present disclosure.

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

As used herein, "applicant" or "candidate" generally refers to any individual and is not limited to those individuals that have applied to a particular position or role. For example, an applicant can include an individual in control of a user account on a social media platform, an individual at a particular company, an individual possessing a particular skillset or experience, or an individual currently or formerly residing at a particular location or working in a particular industry.

In at least one embodiment, data may be excluded from processes described herein in order to adhere to one or more of government regulations, corporate policies, data consent agreements, privacy regulations, and other policies addressing data privacy. In some embodiments, a corporate policy may mandate that personal data be omitted from processes described herein. In at least one embodiment, the present system may exclude, from the processes, personal data including, but not limited to, financial health, debt obligations, marital status, age, social media activities, and other data. In further embodiments, a government regulation may mandate that personal data be anonymized. In still further embodiments, the present system may execute one or more anonymization processes on personal data in adherence to the government regulation.

Overview

In various embodiments, the present system may implement various machine learning techniques, NLG practices, and data normalization processes to analyze data and generate predictions. In one embodiment, the analyzed data may include candidate data, position data, recruitment data, and other information. In at least one embodiment, the predictions may include, but are not limited to, predictions for whether or not a candidate is likely to be a contingent, contract, and/or gig (CCG)-based position holder, predictions for whether or not a candidate is likely to accept a CCG-based position for their next job, and predictions for whether or not a candidate is likely to engage with recruitment communications related to CCG-based positions. In one or more embodiments, the NLG techniques may include, but are not limited to, processing data and identifying language that is likely to elicit engagement from a candidate when included in candidate communications related to CCG-based positions, and automatically generating communications (or components thereof) based on identified language.

In at least one embodiment, the present system may automatically or manually (e.g., in response to input) collect, retrieve, or access data including, but not limited to, candidate data, recruitment data, and position data. In one or more embodiments, the system may collect data by a plurality of methods including, but not limited to, initiating requests at data sources (e.g., via an application programming interface (API)), scraping and indexing webpages and other information sources, retrieving data from a data store, and receiving and processing inputs or other uploaded information (e.g., such as an uploaded resume, position offer, advertisement, etc.). In one example, to collect recruitment data, the system receives and processing a set of inputs and uploads from a particular user account with which a recruiting agency is associated.

In various embodiments, the system may continuously and/or automatically monitor data sources for changes in candidate data and other information. In at least one embodiment, upon detecting a change in candidate data or other information, the system may perform actions including, but not limited to, automatically collecting, storing, and organizing the changed candidate data or other information, generating and transmitting alerts to one or more entities (e.g., recruiters, companies, etc.) indicating the change in candidate data and/or an impact thereof on an associated candidate's likelihood to be a current CCG-based position holder, likelihood to accept a CCG-based position, and/or likelihood to engage with CCG-related recruitment communications, re-training one or more machine learning models to account for the changed data, and re-executing one or more machine learning processes to generate updated predictions and classifications based on the changed data.

In at least one embodiment, the present system may perform machine learning techniques to generate predictions of candidate alignment, behavior, and decisions. In one or more embodiments, machine learning methods may include, but are not limited to, neural networks, gradient boosting algorithms, mutual information classifiers, random forest classification, and other machine learning techniques and related algorithms. In various embodiments, machine learning model generation, execution, and training may be performed according to one or more equations. For example, iterative machine learning model generation and training may be performed according to Equation 1, in which $E(x_{ijg})$ represents the ensemble model, $f_k(x)$ represents an individual model, and $x_{ijg}$ represents a vector of characteristics for a candidate, i, working at company, j, in a role, g.

$$E(x_{ijg}) = E(h(x_{ijg}), \ldots, f_n(x_{ijg})) \quad \text{(Equation 1)}$$

As another example, machine learning predictions may be formatted as classifications according to methods similar to methods implemented in Equation 2, in which $h(x_{ijg})$ is a machine-learned prediction from the one or more machine-learned predictions, $h_0$ is a predefined "non-CCG" threshold, $h_1$ is a predefined "potentially CCG" threshold, $h_2$ is a predefined "likely CCG" threshold, $c(x_{ijg})$ is the classification to which each one the one or more machine-learned predictions is assigned.

$$c(x_{ijg}) = \begin{cases} \text{candidate is least likely to be } CCG \text{ if } h(x_{ijg}) < h_0 \\ \text{candidate may be } CCG \text{ if } h_0 < h(x_{ijg}) < h_1 \\ \text{candidate is more likely to be } CCG \ h_1 < h(x_{ijg}) < h_2 \\ \text{candidate is most likely to be } CCG \ h(x_{ijg}) > h_2 \end{cases} \quad \text{(Equation 2)}$$

The machine learning models may leverage one or more algorithms to evaluate, analyze, and classify data inputs, and generate and classify outputs. For example, the system may include algorithms including, but not limited to, one or more contingent, contract, and/or gig (CCG)-based position holder likelihood algorithms, one or more CCG-based position acceptance likelihood algorithms, one or more CCG-based communication engagement likelihood algorithms, one or more likelihood to be a contingent position holder algorithms, one or more likelihood to be a contracted position holder algorithms, one or more likelihood to be a gig-based position holder algorithms, one or more likelihood to accept a contingent position algorithms, one or more likelihood to accept a contract position algorithms, and one or more likelihood to accept a gig-based position algorithms.

It will be understood to one of ordinary skill in the art that no limitation is placed on sequencing of machine learning and/or NLG processes, and any combination, sequence, and configuration of machine learning and/or NLG processes may be formulated without departing from the spirit and scope of the present disclosure. In various embodiments, the system may only perform machine learning processes related to predicting CCG-based position holder status and CCG-related communication engagement. In one or more embodiments, the system may only perform machine learning processes related to predicting CCG-based position acceptance and CCG-related communication engagement. In at least one embodiment, the system may perform machine learning processes related to predicting: 1) only contingent, only contract, or only gig-based position holder status; 2) only contingent, only contract, or only gig-based position acceptance; 3) only contingent, only contract, or only gig-related communication engagement; 4) overall communication engagement (e.g., likelihood to engage with any recruitment-related communication; 5) only full-time-related communication engagement; 6) only CCG-related communication engagement; and 7) engagement with a particular set of communication language; 8) engagement with communications delivered via a particular communication method (e.g., emails to a personal email address, messages to a LinkedIn™ profile, text messages, etc.); and 9) engagement with communications having one or more communication parameters (e.g., communications delivered before 9 AM, communications with particular subject lines, etc.).

In at least one embodiment, the present system may identify candidates that demonstrate hybridity in their employment source selections. In various embodiments, hybridity, as described herein, may refer to a quality of performing both CCG-based and non-CCG-based roles. For example, a candidate with an employment history that includes a previously-held non-CCG-based position, such as a taxi driving position, and a currently-held CCG-based position, such as an Uber™ driving position, may be found to demonstrate hybridity in their employment source selections. In one or more embodiments, the present system may analyze hybridity-demonstrating candidates to identify circumstances and/or criteria that may be predictive of when a candidate may choose a particular employment source type (e.g., non-CCG employment) over another employment source type (e.g., CCG-based employment). For example, an embodiment of the system may process candidate data (and other information) and identify that a candidate has previously held both non-CCG and CCG-based positions. In the same example, the system may analyze the candidate data via machine learning methods to identify parameters and/or data patterns that appear predictive for the candidate's choice of employment source type. In an exemplary scenario, the system may determine that the candidate is most likely to accept a CCG-based position for their next employment source, if the CCG-based position offers an hourly gig-based wage that amounts to at least 120% of an effective non-CCG hourly wage being currently collected by the candidate (e.g., as a salary). In the same exemplary scenario, the system may determine that the candidate is most likely to accept a non-CCG position over a CCG-based position when the non-CCG position includes opportunities for remote work. Continuing the same exemplary scenario, the hybridity analysis may inform an organization currently employing the candidate on potential methods for retaining the employee (e.g., by offering remote work, increasing effective hourly wage or salary, etc.).

In one or more embodiments, by identifying driving factors behind candidate employment source decisions, the system may allow a recruiter to more specifically target the candidate (e.g., in recruitment communications, etc.). In at least one embodiment, because candidates may not be conscious of all factors driving their own employment decisions, in the same exemplary scenario, the hybridity analysis may inform the candidate of potential factors to consider when evaluating future employment sources (e.g., is the offered hourly wage of a CCG-based position greater than 125% of the candidate's current effective hourly wage, does the CCG-based position offer remote work, etc.).

Exemplary Embodiments

Referring now to the figures, for the purposes of example and explanation of the fundamental processes and components of the disclosed systems and processes, reference is made to FIG. 1, which illustrates an exemplary networked environment 100. As will be understood and appreciated, the exemplary, networked environment 100 shown in FIG. 1 represents merely one approach or embodiment of the present system, and other aspects are used according to various embodiments of the present system.

In various embodiments, the networked environment 100 includes a prediction system configured to perform one or more processes for predictive targeting and engagement. The networked environment 100 may include, but is not limited to, a computing environment 201, one or more data sources 203, and one or more computing devices 205 over a network 204. The network 204 includes, for example, the Internet, intranets, extranets, wide area networks (WANs), local area networks (LANs), wired networks, wireless networks, or other suitable networks, etc., or any combination of two or more such networks. For example, such networks can include satellite networks, cable networks, Ethernet networks, and other types of networks.

According to one embodiment, the computing environment 201 includes, but is not limited to, a candidate service 207, a model service 209, a communication service 211, and a data store 213. The elements of the computing environment 201 can be provided via a plurality of computing devices that may be arranged, for example, in one or more server banks or computer banks or other arrangements. Such computing devices can be located in a single installation or may be distributed among many different geographical locations. For example, the computing environment 201 can include a plurality of computing devices that together may include a hosted computing resource, a grid computing resource, and/or any other distributed computing arrangement. In some cases, the computing environment 201 can correspond to an elastic computing resource where the allotted capacity of processing, network, storage, or other computing-related resources may vary over time.

In various embodiments, the data source 203 generally refers to internal or external systems, pages, databases, or other platforms from which various data is received or collected. Non-limiting examples of data sources 203 include, but are not limited to, human resources systems, recruitment systems, resume processing systems, applicant and talent pools, public databases (e.g., criminal record systems, company information databases, university systems, social media platforms, and etc.), private and/or permissioned databases, webpages, and financial systems. In one example, a data source 203 includes a social networking site for professional development from which the computing environment 201 collects and/or receives candidate profiles. In another example, a data source 203 includes a geolocation service form which the computing environment 201 retrieves addresses and other location data.

The candidate service 207 can be configured to request, retrieve, and/or process data from data sources 203. In one example, the candidate service 207 is configured to automatically and periodically (e.g., every 6 hours, 3 days, 2 weeks, etc.) collect position fulfillment information from a database of a recruitment agency. In another example, the candidate service 207 is configured to request and receive background data (e.g., criminal history, debt information, etc.) from a background check service. In another example, the candidate service 207 is configured to receive credit reports from a credit monitoring platform (e.g., such as Equifax™, Transunion™, or Experian™).

The candidate service 207 can be configured to monitor for changes to various information at a data source 203. In one example, the candidate service 207 monitors for changes to employment status for a plurality of user accounts at a social networking site. In this example, the candidate service 207 detects that an employment status of a particular individual has changed from "Software Development 3 at Company A" to "Freelance Coder." Continuing this example, in response to the determination, the candidate service 207 automatically collects the new employment information, which may be stored in the data store 213. The candidate service 207 can perform various data analysis, modifications, or normalizations to the various information. The candidate service 207 can determine likely categories or bins for various data for each candidate. As an example, the candidate service 207 can determine that the "Software Development 3 at Company A" fits into a middle-level bin for job skill for the job title being a "3" of 5 level and is likely a full time position based on title and company information. Further, the candidate service 207 can determine that the "Freelance Coder" position may be of the CCG category and that the skill level associated with the position may be indeterminate.

In some embodiments, the candidate service 207 is configured to perform one or more actions, for example, in response to input received from a computing device 205. In one example, in response to a request for information on a particular candidate profile, the candidate service 207 analyzes historical candidate data 217 and position data 219 and determines positions and position types that the particular candidate profile viewed, selected, or dismissed within a particular time period (e.g., within the past 2 weeks, 3 months, 2 years, etc.). In this example, the positions and position types are displayed at a computing device 205 from which the request is received. In another example, the candidate service 207 identifies and transmits candidate criteria demonstrated by individuals employed with particular employment sources (e.g., non-CCG sources, contract sources, etc.), with particular organizations, and/or with particular job titles. In this example, the candidate criteria can provide a candidate or a recruiter with an overview of exemplary candidate qualities and other information that may be relevant to recruitment processes for other employment sources, organizations, or positions (e.g., which may be similar or dissimilar to those with which the candidate criteria is associated). In another example, the candidate service 207 receives a request to evaluate a particular candidate profile for a CCG position. In this example, the candidate service 207 retrieves candidate data 217 (and/or other data) with which the particular candidate profile is associated and compares the candidate data 217 to historical candidate, position, or recruitment data with which the CCG position (or similar positions) are associated. Continuing the example, based on the comparison, the candidate service 207 determines one or more deficiencies in qualifications, experience, etc. that, when filled, may increase the likelihood that the candidate is accepted to the CCG position. In the same example, the one or more deficiencies are displayed on the computing device 205.

The model service 209 can be configured to perform various data analysis and modeling processes. In one example, the model service 209 generates and trains machine learning models for predicting a likelihood of a candidate to be a CCG worker, to engage with a CCG-related communication, and/or to leave a current position for a CCG position. In another example, the model service 209 generates and trains machine learning models for predicting a likelihood of communication language to elicit a response from a candidate (e.g., when a communication is generated based on and/or including the communication language). The model service 209 can be configured to generate, train, and execute neural networks, gradient boosting algorithms, mutual information classifiers, random forest classification, and other machine learning and related algorithms.

The model service 209 or candidate service 207 can be configured to perform various data processing and normalization techniques to generate input data for machine learning and other analytical processes. Non-limiting examples of data processing techniques include, but are not limited to, entity resolution, imputation, and missing, outlier, or null value removal. In one example, the model service 209 performs entity resolution on candidate data for a plurality of individuals to standardize terms such as position titles, company names, and locations. Entity resolution may generally include disambiguating manifestations of real-world entities in various records or mentions by linking and grouping. In one embodiment, a dataset of candidate data may include a plurality of names for a single employer. In one or more embodiments, the system may perform entity resolution to identify data items that refer to the same employer, but may use variations of the employer's title. In an exemplary scenario, a dataset may include references to an employer, Facebook, Inc.; however, various dataset entries may refer to Facebook, Inc. as Facebook™, Facebook, Inc., Facebook.com, and other variants. In the same scenario, an embodiment of the system may perform entity resolution to identify all dataset entries that include a variation of Facebook, Inc., and replace the identified dataset entries with the standard employer name Facebook, Inc. The model service 209 may utilize historical data for various employers to rate a likely skill level of the candidate that worked at the employer. As an example, the model service 209 may identify that future job positions for candidates that worked for Employer A correlate with better future job titles than candidates that worked for Employer B. The model service 209 may adjust the skill level or qualifications of a candidate based on evaluations of other employees from a shared employer.

The communication service 211 can be configured to generate communications (e.g., or language to be included in communications). In some embodiments, the communication service 211 performs one or more natural language generation (NLG) processes to automatically generate language for communications to candidates. The communication service 211 can leverage machine learning processes (e.g., via the model service 209) to generate communications that are optimized to increase a likelihood of the communications eliciting a response from one or more candidates. In some embodiments, the communication service 211 optimizes communications based at least in part on user data 215 with which a request is associated. For example, the communication service 211 can retrieve, and include in a communication, contact details and a custom signature that corresponds to a user account from which a request was received. In at least one embodiment, the communication service 211 optimizes communications based on candidate data 217 with which a particular candidate is associated and/or position data 219 or recruitment data 221 with which a request is associated. For example, the communication service 211 may adjust a greeting, closing, writing style, or language style based on candidate data 217 for the particular candidate.

The communication service 211 may evaluate writing style, grammar, vocabulary, or other aspects of candidate data 217 originating from each particular candidate, such as, for example, a resume, writing samples, email correspondence with recruiters, social media posts, and other candidate data 217. In one example, the vocabulary may be adjusted to match a reading level of a particular candidate based on the candidate data 217 indicating an education level or that a writing sample matches a particular reading level. The communication service 211 may select phrases or sayings that are included as authored by the candidate in candidate data 217. In at least one embodiment, the communication service 211 includes a third party natural language generation service.

The communication service 211 may evaluate historical information from past communications to select language. As an example, the communication service 211 can determine that particular phrases may have a higher response rate than other phrases by analyzing past communications and known outcomes of those past communications. In one example, a "I hope you are doing well" greeting to start an email may have a 5% higher response rate than starting the email with "We have a great job opportunity for you." The communication service 211 can select language and style (e.g., fonts, font size, font color, use of bold, italics, underline, etc.) that is determined to correlate with an improved response rate or an improved ultimate job placement rate.

The data store 213 can store various data that is accessible to the various elements of the computing environment 201. In some embodiments, data (or a subset of data) stored in the data store 213 is accessible to the computing device 206 and one or more external system (e.g., on a secured and/or permissioned basis). Data stored at the data store 213 can include, but is not limited to, user data 215, candidate data 217, position data 219, recruitment data 221, and model data 223. The data store 213 can be representative of a plurality of data stores 112 as can be appreciated.

The user data 215 can include information associated with one or more user accounts. For example, for a particular user account, the user data 215 can include, but is not limited to, an identifier, user credentials, and settings and preferences for controlling the look, feel, and function of various processes discussed herein. User credentials can include, for example, a username and password, biometric information, such as a facial or fingerprint image, or cryptographic keys such as public/private keys. Settings can include, for example, communication mode settings, alert settings, schedules for performing machine learning and/or communication generation processes, and settings for controlling which of a plurality of potential data sources 203 are leveraged to perform machine learning processes.

In one example, the settings include a configuration parameter for a particular position location or region. In this example, when the configuration parameter is set to a particular region, a machine learning and/or natural language generation process can be adjusted to account for a work culture or other set of factors with which the particular region is associated. Various regions and sub-regions of the world may demonstrate varying work cultures. Because work culture may vary, data that is useful in generating accurate and precise CCG-related predictions may also vary, in addition to variances in magnitudes of impact and impact directionality imposed on machine-learned predictions. For example, work culture of a particular region may be such that employees do not often experience mobility within their company. In the same example, the work culture may be such that employees typically remain with their company for an extended time period (e.g., decades, as compared to years in other work cultures). In various embodiments, the system may configure one or more machine learning and/or NLG processes to account for variations in work culture. For example, the system may alter one or more machine learning parameter weights to reduce an impact or change impact directionality on likelihood predictions. In the above example, the system may reduce machine learning parameter weights and/or modify parameter impact directionality for parameters including number of promotions, job latency, and job tenure, thereby reducing the parameters' impact on subsequently generated likelihood predictions.

The candidate data 217 can include, but is not limited to, candidate names, locations, such as, for example, a list of current and previous addresses, education history, job satisfaction (e.g., job and/or workplace reviews), age, family status, marital status, debt obligations, financial health (for example, a credit score), and social media activities (e.g., such as a list of followers, postings, etc.). In one example, candidate data includes work history, such as past and current job titles, positions, roles, employers, salary and/or wage information, candidate performance reviews, job locations, and resumes. In at least one embodiment, personally identifying data, financial data, social media data, and other personal data (e.g., family and marital status, etc.) may not be collected or leveraged or may be intentionally excluded for processes described herein (e.g., in accordance with legal policy, corporate policy, data privacy policy, user consent parameters, etc.). In some embodiments, candidate data 217 includes criminal records, degree history, liens, voting history, and other data obtained from investigative processes (e.g., such as information obtained from a background check performed on a particular candidate). The candidate data 217 can include assets owned by candidates including timing information as to when those assets were purchased, such as, for example, real estate including primary residences and secondary residences, vehicles, boats, planes, and other assets. The candidate data 217 can include current estimated values and debts associated with each asset.

The position data 219 can refer to data associated with employment opportunity and fulfillment information. Position data 219 can include, but is not limited to, position titles, position duties, responsibilities, and tasks. Position data 219 may include position locations, such as, for example, a list of current and previous addresses to which candidates holding a position have been located. Position data 219 may include position fulfillment history, such as, for example, past and current position holders, position providers (e.g., institutions, companies, etc. that offer or provide labor filling CCG-based positions), salary and/or wage information, position reviews, position provider reviews, and resumes, C.V.'s, or the like, of past and current position holders. Position data 219 may include past and current position holder education histories, job satisfaction (for example, job and/or workplace reviews related to any number of current or past-held positions), age, family status(es), marital status (es), past and current debt obligations, past and current financial health, (for example, a credit score), and social media activities. In some embodiments, the networked environment 100 is configured to process a position holder's resume and/or employee files and determine various position data 219, such as a work history, education history, and location history.

The recruitment data 221 can refer to data associated with an employment opportunity, such as a desired set of experiences or other criteria. In one example, the recruitment data 221 includes candidate criteria, such as desired experience (e.g., skills and/or work history), location, education, compensation history and/or requirements, and other candidate qualifications.

The model data 223 can include data associated with machine learning and other modeling processes described herein. Non-limiting examples of model data 223 include, but are not limited to, machine learning models, parameters, weight values, input and output datasets, training datasets, validation sets, configuration properties, and other settings. In one example, model data 223 includes a training dataset including historical candidate data 217, recruitment data 221, and position data 219. In this example, the training dataset can be used for training a machine learning model to predict a likelihood of a candidate being willing to consider or accept a CCG job position.

In various embodiments, the model data 223 may include work culture categories that can be provided as an input to machine learning processes. In at least one embodiment, a work culture category may be used by the modeling service 209 to modify data that is input to and analyzed via one or more machine learning models. In one embodiment, a work culture category may be used by the modeling service 209 to modify outputs generated by one or more machine learning models. For example, a work culture category associated with a work culture that utilizes a Sunday-Thursday work week may cause a machine learning model to downgrade or reduce generated likelihoods of a candidate (operating in that work culture) accepting a gig-based position that includes Friday working hours.

In one or more embodiments, a work culture category may be used by the modeling service 209 to cause one or more machine learning models to initialize parameter weights at a higher or lower magnitude, or with a positive or negative directionality. For example, a work culture category for a "Country X" may be input to a machine learning process for identifying candidates likely to accept a gig-based position. In the same example, the "Country X" work culture category may cause one or more machine learning models to exclude input data related to job tenure, promotions, and employer reviews when analyzing candidates from "Country X" (e.g., establishing that job tenure, promotions, and employer reviews are not predictive for likelihood of the candidates to accept a gig-based position). Continuing with this example, the "Country X" work culture category may also cause the one or more machine learning models to establish a negative impact directionality on parameters and data related to experience level and skill levels (e.g., establishing that a greater experience level and skill level makes candidates from "Country X" less likely to accept gig-based positions).

In an alternate example, a work culture category for a "Country Y" can be input to the machine learning process for identifying candidates likely to accept a gig-based position. In the same example, the one or more machine learning models may exclude data related to location and age when analyzing candidates from "Country Y" (e.g., establishing that location and age are not predictive for likelihood of the candidates to accept a gig-based position). Continuing the same example, the "Country Y" work culture category may cause the one or more machine learning models to increase an initial weight of parameters related to job latency (e.g., establishing that job latency may be more predictive for likelihood to accept a gig-based position).

The computing device 205 can be any network-capable device including, but not limited to, smartphones, computers, tablets, smart accessories, such as a smart watch, key fobs, and other external devices. The computing device 205 can include a processor and memory. The computing device 205 can include a display 225 on which various user interfaces can be rendered by a candidate application 229 to configure, monitor, and control various functions of the networked environment 100. The candidate application 229 can correspond to a web browser and a web page, a mobile app, a native application, a service, or other software that can be executed on the computing device 205. The candidate application 229 can display information associated with processes of the networked environment 100 and/or data stored thereby. In one example, the candidate application 229 displays candidate profiles that are generated or retrieved from user data 215. In another example, the candidate application 229 displays a ranked list of candidates classified as "Most Likely to be CCG" or, in another example, as "Most Likely to Engage with CCG Communications."

The computing device 205 can include an input device 227 for providing inputs, such as requests and commands, to the computing device 205. The input devices 227 can include a keyboard, mouse, pointer, touch screen, speaker for voice commands, camera or light sensing device to reach motions or gestures, or other input device. The candidate application 229 can process the inputs and transmit commands, requests, or responses to the computing environment 201 or one or more data sources 203. According to some embodiments, functionality of the candidate application is determined based on a particular user account or other user data 215 with which the computing device 205 is associated. In one example, a first computing device 205 is associated with a recruitment user account and the candidate application 229 is configured to display candidate profiles and provide access to candidate prediction and communication generation processes. In this example, a second computing device 205 is associated with a candidate user account and the candidate application 229 is configured to allow the computing device 205 to transmit candidate data 217 to the computing environment 201 and to display communications, such as recruitment messages and alerts.

Figure 2:
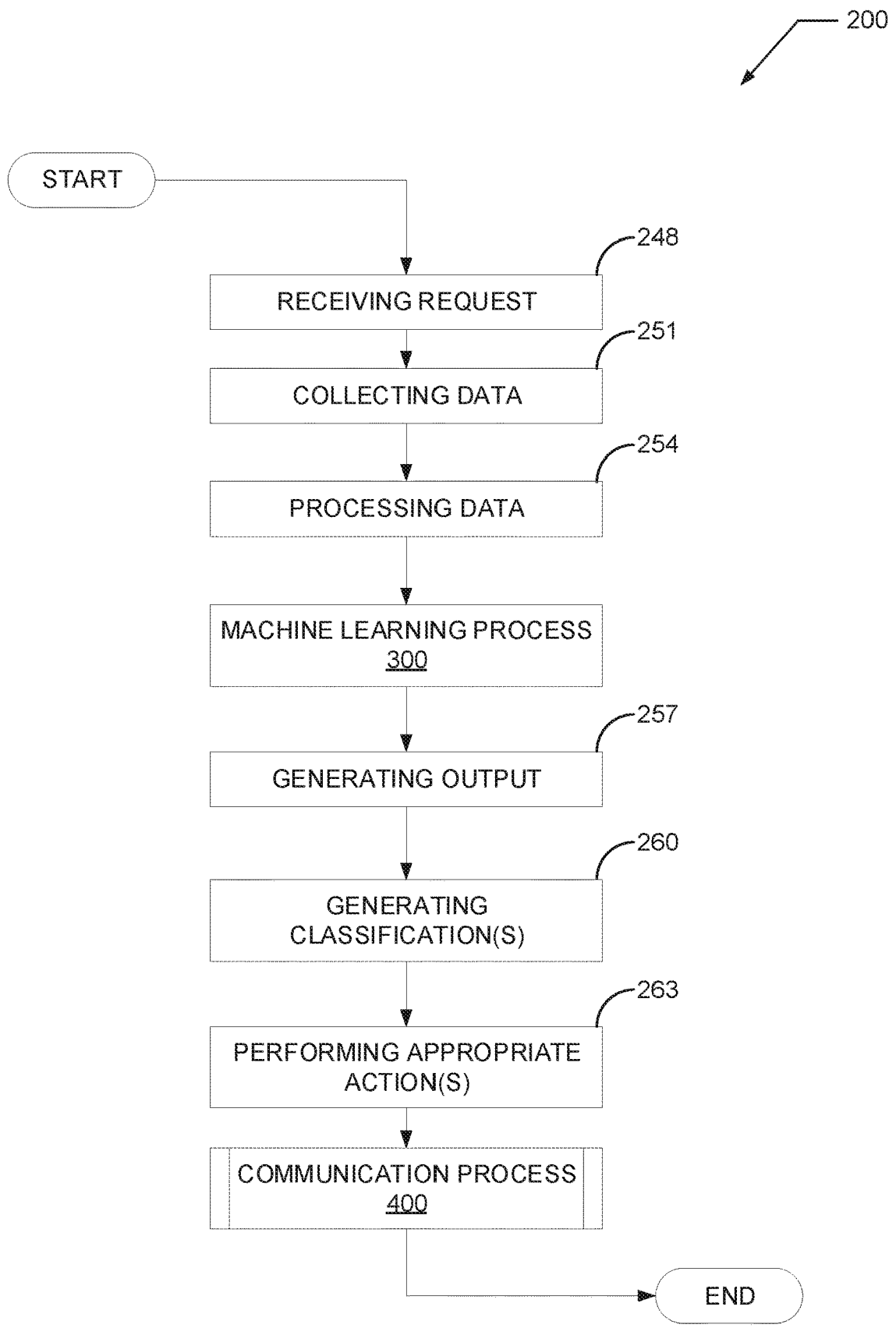
FIG. 2 shows an exemplary prediction process, according to one embodiment of the present disclosure.

FIG. 2 shows an exemplary prediction process 200, according to one embodiment of the present disclosure. As will be understood by one having ordinary skill in the art, the steps and processes shown in FIG. 2 (and those of all other flowcharts and sequence diagrams shown and described herein) may operate concurrently and continuously, are generally asynchronous and independent, and are not necessarily performed in the order shown.

At step 248, the process 200 includes receiving a request. The request can be to initiate predictive targeting processes for particular candidate data 217, position data 219, or recruitment data 221. For example, the request can be to initiate predictive targeting processes for identifying candidates that are likely to be CCG workers, to accept a particular CCG-based position or role, or to engage with a particular CCG-related communication. As another example, the request can be to initiate a talent retention analysis for a particular set of candidates that are employed at a particular company. In this example, the talent retention analysis can leverage machine learning processes to predict which of the set of candidates is more likely to leave non-CCG role and accept a CCG position.

In at least one embodiment, the request includes a description of one or more candidates, one or more positions, and/or one or more position offers. The description can include, for example, candidate criteria that provide a set of candidate parameters for a particular position (e.g., the particular position corresponding to a CCG class of positions). The request can be received from a computing device 205 (e.g., via inputs to a candidate application 229). The request can be automatically initiated, for example, in response to detecting a change in the status of one or more candidates, one or more positions, or other information. The request can be automatically initiated based on a predetermined schedule. For example, a particular user account can include a setting to automatically perform predictive targeting every 24 hours, every week, every quarter, etc. The request can include an output format, such as, for example, a ranked list of candidates, a report of most and/or least influential parameters, or a summary of a most highly-ranked candidate (e.g., including information associated with the candidate, one or more predictions, and one or more influential parameters).

At step 251, the process 200 includes receiving data. The particular data that is received can be based at least in part on the request. In one example, the request includes a command to initiate machine learning processes to predict a respective likelihood of interest in a CCG class of positions for each of the one or more candidates (e.g., the request including a description thereof each). In this example, in response to the request, the candidate service 207 receives candidate data 217, position data 219, and/or recruitment data 221 with which a first and a second subset of individuals are associated. Continuing the example, the first subset of individuals can correspond to a known non-CCG worker class and the second subset of individuals can correspond to a known CCG worker class.

Receiving the data can include collecting and/or retrieving data from one or more data sources 203 or the data store 213. For example, the candidate service 207 automatically requests and receives historical recruitment information and position fulfillment information from an external human resources system. In another example, the candidate service 207 automatically scrapes and indexes publicly accessible data sources 203 to collect candidate data 217, position data 219, recruitment data 221, and/or other information. In another example, the candidate service 207 automatically identifies and retrieves job postings and/or historical recruitment data 221. In this example, the candidate service 207 identifies the job postings based on criteria included in a request, such as, for example, a desired experience level, skill set, location, and employment history. The computing environment 201 can be configured to receive data for a particular number (e.g., 100, 1000, 10,000, etc.) and/or class of candidates. In one example, the candidate service 207 retrieves historical candidate data 217 describing 10,000 known CCG-based position holders and 10,000 known non-CCG position holders. In another example, historical candidate data 217 is retrieved that describes known CCG-related communication engagers and known CCG-related communication non-engagers, or that describes known CCG-based position acceptors and known CCG-based position rejecters.

According to one embodiment, a number of candidates, or the like, analyzed in a machine learning process is automatically determined (e.g., based on data available or based on other factors or processes). In some embodiments, the number of candidates is manually configured (e.g., via input). In some embodiments, data is requested or received via an application programming interface (API) that provides access to one or more data sources 203. In at least one embodiment, the present systems and methods may omit personally identifying or other personal data from collection and/or from processes described herein or, in some embodiments, require an affirmative consent input from a candidate associated with the personally identifying and other personal data. In one or more embodiments, a consent input may refer to a selection made on a computing device 205 in response to a consent query that asks whether or not a candidate consents to usage of particular personally identifying and/or other personal data (e.g., with an indication being provided and relating that anonymization of such data will be performed if the candidate consents to its use).

At step 254, the process 200 includes processing data. Data processing can include, but is not limited to, performing text recognition and extraction techniques, data normalization techniques (e.g., such as data imputation or null value removal), entity resolution techniques, and/or (pseudo-)anonymization techniques. In at least one embodiment, processing the data includes anonymizing or pseudo-anonymizing personally-identifying information (PII). In one example, the candidate service 207 automatically processes candidate resumes, candidate information, and other historical candidate data stored in one or more databases. In this example, the model service 209 receives the processes candidate resumes, information, and historical data, and performs one or more entity resolution techniques to identify and standardize equivalent information across the processed data (e.g., by replacing mutual terms with a standardized term). In another example, the candidate service 207 processes candidate information scraped from a public profile hosted at a social media webpage. In this example, the candidate service 207 can recognize key information and terms, such as, for example, a current employment status, a particular skill or experience, a particular qualification, or other factors.

In one example, the candidate service 207 processes a candidate's resume and identifies a work history, education history, and location history. In the same example, the candidate service 207 applies a pseudo-anonymization technique to the location history to remove identifying details (e.g., house number, street name, etc.) from home addresses included in the location history. In the same example, the model service 209 performs an entity resolution process to replace titles and roles in the work history with industry-standardized positions.

Figure 3:
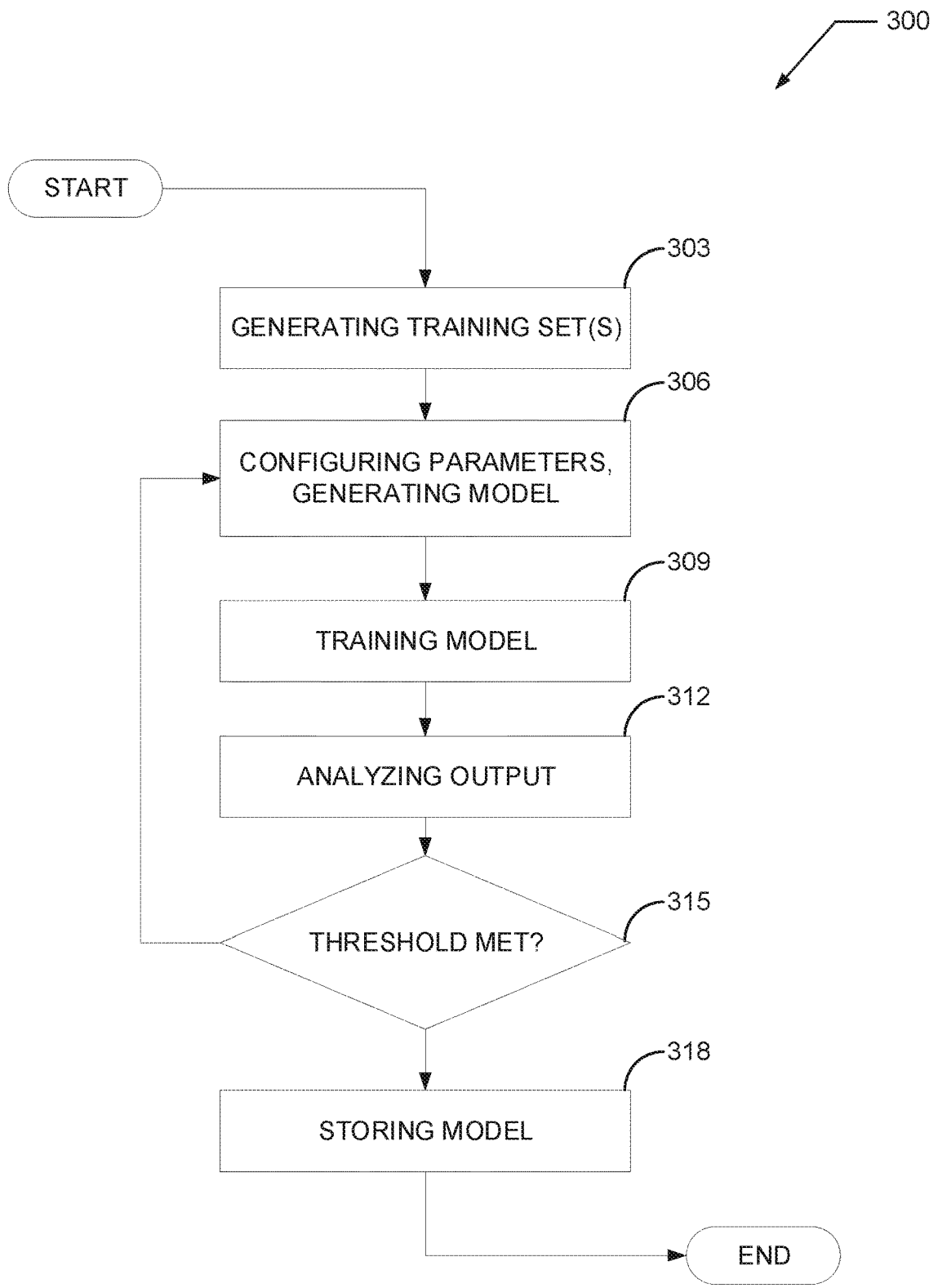
FIG. 3 shows an exemplary machine learning process, according to one embodiment of the present disclosure.

A machine learning process (e.g., such as an embodiment of the machine learning process 300 shown in FIG. 3) can be performed to generate and train one or more machine learning models. The machine learning model can be configured to generate various predictions, such as, for example, predicting a likelihood of a candidate to be a CCG worker, to engage with a CCG-related communication, or to leave a non-CCG position for a CCG position. By the machine learning process, a first machine learning model can be trained using a training dataset including known inputs and outputs. The first machine learning model can include one or more parameters and one or more weight values that determine a magnitude of influence each parameter contributes to an output of the first machine learning model. The parameters and/or weights can be analyzed to determine an accuracy of the first machine learning model. Based on the analysis, the parameters and/or weights can be optimized (e.g., to improve accuracy metrics, reduce error metrics, or improve other metrics, such as bias metrics). One or more secondary machine learning models can be generated based on the optimized parameters and/or weight values, the secondary machine learning model being configured to generate output from input for which there is not known output.

A first machine learning model can be leveraged to identify trends, correlations, and patterns between candidate descriptions and corresponding candidate statuses (e.g., such as holding a CCG position or having not engaged with previous CCG-related recruitment communications). In one example, a first machine learning model is trained to classify candidates as a CCG-based position acceptor or a CCG-based position rejecter. In this example, the first machine learning model is trained using a dataset of candidate descriptions associated with 10,000 known CCG-based position acceptors and 10,000 known CCG-based position rejecters. Continuing this example, a particular iteration of the first machine learning model is determined to satisfy one or more error metrics and output of the particular generation (e.g., scores, weight values, parameter to output relationships) is leveraged to configure parameters and/or other properties of a secondary machine learning model for predicting a likelihood that a candidate will accept a CCG-based position. In the same example, the output indicates that negatively predictive factors include holding a non-CCG position for more than five years, receiving a promotion at a non-CCG position within the past two years, and residing at the same location for at least four years. Continuing the example, for the secondary machine learning model, the negatively predictive factors (e.g., or equivalent machine learning parameters) are assigned a negative directionality which causes demonstration of one or more negatively predictive factors by a candidate to contribute negatively to a prediction score. In the same example, a magnitude of the negative directionality is based at least in part on weight values with each factor is associated and which were generated during training of the first machine learning model. Each weight value can determine, at least in part, a level of influence the corresponding factor exercises over an output of the secondary machine learning model.

At step 257, the process 200 includes generating output. In one or more embodiments, upon satisfying error metric thresholds, a trained machine learning model may be used to analyze candidate and/or position data describing candidates whose status for a particular classification is unknown. In at least one embodiment, the system may execute the trained machine learning model on an input dataset, and the trained machine learning model may output a set of likelihood predictions (e.g., Booleans, scores, etc.) describing, for each candidate, a likelihood of being associated with a predetermined classification, status, or category. For example, the system executes a trained, secondary machine learning model to predict, for each respective candidate, a likelihood being a CCG-based position holder, a likelihood of accepting a CCG-based position, or a likelihood of engaging with CCG-related communications. In this example, the input dataset includes one or more of candidate data 217, position data 219, and recruitment data 221 (e.g., that was collected or received at step 251 and processed at step 254).

In at least one embodiment, the machine learning model may also output or identify, for each candidate, one or more portions or parameters of the input dataset that were most influential upon the candidate's associated likelihood prediction. In one or more embodiments, to identify and report the most influential portions, the machine learning model may determine one or more machine learning parameters that were most heavily weighted. In at least one embodiment, the machine learning model determines and outputs one or more most-weighted machine learning parameters that positively influenced a likelihood prediction, and may also identify one or more most-weighted machine learning parameters that negatively influenced a likelihood prediction. In one example, for a candidate classified as more likely to be a CCG-based position acceptor, parameter weight values of an associated machine learning model indicate that the candidate's resume, including a mention of prior CCG-based work experience, is the most positively impacting parameter, and indicate that the candidate's current above-industry-average non-CCG salary is the most negatively impacting parameter. By identifying and reporting most-weighted parameters, the computing environment 201, in various embodiments, may provide for identification and tracking of parameters and candidate factors that are most important in evaluating CCG status, CCG-based position acceptance, or CCG-related communication engagement.

In an exemplary scenario, a threshold-satisfying secondary machine learning model is retrieved or generated (e.g., based on corresponding model data 223). The secondary machine learning model is configured to analyze and generate CCG position holder predictions for 1,000 candidates of unknown CCG-based position status. Descriptions for each of the 1,000 candidates are received and processed to generate an input dataset. The particular iteration of the secondary machine learning model is executed on the input dataset and generates a prediction output including a plurality of prediction scores by which each of the 1,000 candidates is classified. The prediction output further includes one or more parameters that were most negatively or positively impactful on each candidate's associated prediction score.

In various embodiments, machine learning processes may be performed in various configurations, workflows, and sequences, for example, to filter through candidates in a particular manner or order. In one example, a first machine learning process is performed to predict candidates likely to engage with any recruitment-related communication, and a second machine learning process to predict candidates, from a subset of candidates identified in the first process, that are likely to engage with CCG-related recruitment communications. In another example, a first machine learning process is performed to predict, from a population of known non-CCG-based position holding candidates, a first set of candidates that are most likely to be interested in CCG-related positions. In the same example, a second machine learning process is performed to predict, from first the set of candidates, a subset of candidates that are most likely to engage with CCG-related recruitment communications.

At step 260, the process 200 includes generating one or more classifications. The classification can be generated by comparing output of a machine learning model to one or more thresholds (e.g., for example, thresholds defined similarly to those provided in Equation 2). In one example, a machine learning model is configured to predict a likelihood of a candidate being a CCG position holder. In this example, the machine learning model generates a prediction score that is compared to one or more thresholds. The one or more thresholds can include, for example, a first score level that corresponds to a "Less Likely to be CCG" classification, a second score level, (e.g., greater than the first score level) that corresponds to a "Likely to be CCG" classification, and a third score level that corresponds to a "More Likely to be CCG" classification. The thresholds for generating classifications can be heuristically determined and/or computationally optimized. In one example, the thresholds are optimized by performing one or more K-folds cross validation processes using machine learning models trained on training datasets of varying composition (e.g., and, in some instances, mutually exclusive compositions).

In one example, first and secondary machine learning process are performed to generate a secondary machine learning model configured to predict a likelihood of a candidate being a CCG position holder. In this example, from an input set of candidate descriptions, the secondary machine learning model generates output including a prediction score corresponding to each of 1,000 candidates. Continuing the example, the candidate service 207 compares each prediction score to a plurality of increasing thresholds including a first value range corresponding to a "Least Likely to be CCG" classification, a second value range corresponding to a "Less Likely to be CCG" classification, a third value range corresponding to a "Likely to be CCG" classification, a fourth value range corresponding to a "More Likely to be CCG" classification, and a fifth value range corresponding to a "Most Likely to be CCG" classification. In the same example, the candidate service classifies 50 candidates as most likely to be a CCG-based position holder, classifying 100 candidates as more likely to be a CCG-based position holder, classifying 100 candidates as likely to be a CCG-based position holder, classifying 250 candidates as less likely to be a CCG-based position holder, and classifying 500 candidates as least likely to be a CCG-based position holder.

At step 263, the process 300 includes performing one or more appropriate actions. The actions can be performed, for example, based on one or more preferences or settings included in a request or stored in user data 215 with which the request is associated. Non-limiting examples of actions include, but are not limited to, generating particular language designed to provoke a response from one or more candidates, generating a ranking of candidates, altering a profile with which a candidate is associated (e.g., to indicate a status as a CCG worker or to enable or disable particular functions, such as communicating with particular recruiters), determining one or more parameters that most contributed to a classification of a candidate, excluding a candidate from further recruitment processes, generating and rendering a graphical user interface (e.g., via a candidate application 229), generating a portal for accessing machine learning outputs and classifications, generating a candidate- or organization-level summary of outputs, and initiating a process to monitor one or more data sources 203 for changes to data associated with a candidate.

In one or more embodiments, for each candidate, output of the trained secondary machine model includes one or more parameters that were most negatively or positively impactful on the candidate's associated prediction and, thus, on the candidate's classification. In one example, for a candidate classified as more likely to be a CCG-based position holder, the associated output includes parameters and/or weight values indicating that that the candidate's work history, including employment at known CCG labor suppliers, was the most positively impacting parameter, and indicating that the candidate's current five-year tenure in a non-CCG position was the most negatively impacting parameter.

In another example, the process 200 is initiated in response to a request from a particular user account. In this example, the particular user account includes an alert setting for alerting the particular user when a candidate is classified as "More Likely to be CCG." Continuing this example, classifications are generated for a plurality of candidates and a subset of candidates are classified as "More Likely to be CCG." In the same example, an alert is generated and transmitted to the particular user account, the alert including an identification of the subset of candidates.

A communication process (e.g., such as an embodiment of the communication process 500 shown in FIG. 5) can be initiated to generate one or more communications. For example, a communication process can be initiated to generate an email by executing one or more natural language generation processes. One or more machine learning models can be generated and trained to predict optimal language for the communication. The machine learning model can be configured to analyze potential communication language and data with which a candidate is associated. The machine learning model can be trained to predict a likelihood of the candidate engaging with a communication including the potential communication language.

In various embodiments, the communication service 211 generates one or more visualizations describing individual candidates, group of candidates, organizations, and/or other subjects. In at least one embodiment, the communication service 211 is configured to generate visualizations such as radar charts, meters, and other representations of machine-learned predictions, candidate or organization performances, candidate or organization criteria, or other data. In at least one embodiment, the computing environment 201 is configured to generate and/or service one or more online portals, web pages, GUI's, or other online media that allow users to view, configure, and interact with processes, including inputs and outputs thereof, described herein. In various embodiments, the system is configured to generate a portal (e.g., a webpage, application, etc.) that allows a user to search through and view system profiles of candidates evaluated as described herein. In one or more embodiments, the portal includes a search function that allows the system to receive and process search criteria, and return one or more results (e.g., such as system profiles). In one example, the computing environment 201 receives candidate criteria for a candidate that possesses at least five years of software engineering experience and, based on machine learning analysis, is predicted to be more likely to accept a contingent, contract, and/or gig (CCG) class of position for their next employment source. In the same example, the computing environment 201 processes the candidate criteria and serves, via the portal, a list of candidates (e.g., or candidate profiles) that satisfy the candidate criteria.

In at least one embodiment, candidate or organization-level summaries of output are generated. A summary can include, for example, candidate parameters, candidate descriptions, and/or ranked candidate lists (e.g., generated based on assigned classifications). In at least one embodiment, an organization-level labor summary is generated by analyzing an organization's labor force via the machine learning techniques described herein to identify one or more members or groups within the labor force that are classified as a particular status (e.g., likely to accept a CCG-based position, likely to engage in CCG-related communications, etc.). In one example, the computing environment 201 receives data describing each employee of an organization, and predicts each employee's likelihood of accepting a CCG-based position and/or engaging with CCG-related recruitment notifications. In various embodiments, the computing environment 201 may determine, and include in the summary, one or more parameters that are most negatively or most positively influencing an employee's predicted classification. For example, the model service 209 can determine one or more factors that most positively and negatively contribute to an employee's predicted classification as someone more likely to leave the organization for CCG-based roles and/or to engage with CCG-based recruitment communications. In at least one embodiment, by identifying factors that may potentially drive employees to leave or consider leaving the organization, the system may provide the organization with indications including, but not limited to, factors that may be changed to reduce a likelihood of an employee departing or considering departure from the organization, employees that may need to be replaced in the near future, sub-units within the organization (e.g., departments, groups, etc.) that demonstrate labor retention risks.

FIG. 3 shows an exemplary machine learning process 300, according to one embodiment of the present disclosure. In various embodiments, machine learning models are configured to analyze one or more descriptions of one or more candidates and, based on the analysis, predict a respective classification, interest, or other output with which the based on the one or more candidates are associated. In at least one embodiment, analysis of a candidate includes analyzing various input data (and parameters derived therefrom) including, but not limited to, resumes, online profiles (e.g., such as LinkedIn™ pages, Indeed™ pages, GitHub™ profiles, and other online profiles and accounts), education history, employment history, current location and/or location history, compensation data (e.g., such as salary, hourly wage, etc.), employer data (e.g., such as employer size, employer location, corporate structure, job latency, hiring patterns, past and current job listings, reviews, and executive profiles), financial data (e.g., such as credit scores and debt obligations), marital status, family status, age, experience level, skills and certifications, criminal history, and affiliation (e.g., such as affiliations with particular organizations, vendors, labor suppliers, persons, etc.).

At step 303, the process 300 includes generating one or more training datasets. In at least one embodiment, to identify candidates that may hold or may have held CCG-based positions, a first training dataset is generated that includes, but is not limited to, a first portion including candidate and/or position data describing known CCG-based position holders, and a second portion including candidate and/or position data describing known non-CCG position holders. According to one embodiment, a training dataset or dataset may generally refer to a set of historical data that is evaluated by a machine learning model. The machine learning model can evaluate the training dataset for the purposes of improving model accuracy, reducing error, or otherwise improving the model. A training dataset (also referred to as a "teaching" dataset) can include labeled or unlabeled data (e.g., the labeled data including a known output with which the data is associated). In one example, to identify candidates that are likely to accept a CCG-based position for their next employment source, a first training dataset and second training dataset are generated that includes a first portion including candidate and/or position data describing known CCG-based position acceptors, and a second portion is generated that including candidate and/or position data describing known CCG-based position rejecters.

In at least one embodiment, to identify candidates that are likely to engage with CCG-related recruitment communications, a first training dataset is generated that includes a first portion including candidate and/or position data describing individuals who are known CCG-related communication engagers and a second portion including candidate and/or position data describing individuals who are known CCG-related communication non-engagers.

In some embodiments, generating the training dataset includes generating or retrieving one or more datasets describing known suppliers of CCG labor and/or known CCG-based positions. In this example, the candidate service 207 evaluates candidate data 217, position data 219, and other data to determine if a candidate has been or is affiliated with one or more known suppliers of CCG labor and to determine if a candidate has held or currently holds a known CCG-based position. The candidate service 207 can analyze a candidate's resume to determine if names of known CCG labor suppliers are included or to determine if titles of known CCG-based positions are included.

Continuing the example, in response to identifying known CCG-based positions and/or one or more known CCG labor suppliers, the model service 209 includes the determinations (e.g., and/or data that contributed to the determinations) as parameters of a training dataset for predicting a likelihood of a candidate being a CCG-based position holder, being likely to accept a CCG-based position, and/or being likely to engage with CCG-related communications.

At step 306, the process 300 includes configuring one or more parameters and generating a machine learning model (e.g., based on the one or more parameters). Configuring the one or more parameters can include adjusting one or more parameters to reduce an error metric, increase an error metric, or improve other output-related metrics. In at least one embodiment, to reduce the error metrics, the system may perform actions including, but not limited to, identifying one or more most-erroneous parameters that most heavily contributed to error metrics, excluding one or more identified most-erroneous parameters from further machine learning processes, increasing and/or decreasing various parameter weights such that identified most-erroneous parameters may contribute less to the one or more error metrics may be reduce, and executing one or more loss function optimization algorithms.

The system can configure the one or more parameters by adjusting one or more weight values based on output of another machine learning model. In an exemplary scenario, a first machine learning process is performed to train one or more machine learning models to classify a candidate as a CCG-based or non-CCG-based position holder. By the first machine learning process, differences, correlations, and data patterns between CCG position holders and non-CCG position holders are determined and leveraged to generate a secondary machine learning model to predict a likelihood of a candidate being a CCG-based position holder.

Continuing the exemplary scenario, a training dataset is generated based on sets of historical candidate data 217 (and/or other data) with which known CCG position holders and non-CCG position holders are associated, respectively. The training dataset includes data describing 10,000 known CCG-based position holders and 10,000 known non-CCG position holders. Using the training dataset, the first machine learning model is trained to predict a classification of candidates as CCG position holding or non-CCG position holding. The first trained machine learning model is configured to assign initial weights and/or directionality to various parameters (e.g., candidate data, and other information) that are generated from the training dataset (or other input data). From the training process, the model service 209 determines that previously holding a non-CCG position for a tenure greater than two years is negatively predictive for likelihood of a candidate to be a CCG-based position holder. Based on the determination, the model service 209 assigns a negative directionality to the identified parameter, thereby indicating that a candidate's demonstration of the identified parameter should cause a machine learning model to decrease the candidate's predicted likelihood of being a CCG-based position holder.

In the same scenario, the model service 209 determines that demonstrating a job latency of at least six months is positively predictive for likelihood of a candidate to be a CCG-based position holder. Based on the determination, the model service 209 assigns a positive directionality to the identified parameter, thereby indicating that a candidate's demonstration of the identified parameter should cause the first trained machine learning model to increase the candidate's predicted likelihood of being a CCG-based position holder. The magnitude of each directionality is determined based on the weight value with which the parameter is associated and which was generated by the trained first machine learning model.

Continuing the exemplary scenario of the preceding paragraphs, a second machine learning process is performed to generate one or more secondary machine learning models based on the first trained machine learning model. The secondary machine learning model is trained to predict one or more likelihoods of each of the 10,000 known CCG-based position holders and each of the 10,000 known non-CCG position holders as being a CCG-based position holder. The secondary machine learning model can be trained using on the determinations of the first machine learning model, such that determined trends, weights, directionalities, and other parameter-influencing factors are leveraged to improve the performance of the secondary machine learning model.

At step 309, the process 300 includes training a machine learning model (e.g., using one or more training datasets). Training the machine learning model can include, but is not limited to, executing the machine learning model on an input (e.g., a training dataset or subset thereof) and generating an output, such as a prediction score or classification. In one or more embodiments, the model service 209 generates and trains, using the first training dataset, one or more primary machine learning models to identify differences between position holders of a known CCG-based first dataset portion and position holders of a known non-CCG second dataset portion. In at least one embodiment, by identifying the differences, the one or more primary machine learning models may be trained to identify candidate criteria (e.g., candidate data, etc.) that are predictive for CCG-based position holders. According to one embodiment, one or more subsequent machine learning models may be created from the one or more primary machine learning models, and may be configured to analyze candidates and predict a likelihood that one or more candidates are CCG-based position holders. In at least one embodiment, the model service 209 generates and trains one or more primary machine learning models to identify differences between position holders of a first CCG-acceptor dataset portion and position holders of a second CCG-rejecter dataset portion.

In one or more embodiments, the model service 209 may generate and train, using a first training dataset, one or more first machine learning models to identify respective differences between individuals of a communication responder dataset and a communication non-responder dataset. In at least one embodiment, by identifying the differences, the one or more first machine learning models may be trained to identify candidate criteria (e.g., candidate data, etc.) that, for example, are predictive for CCG-related communication engagement or for CCG-based position acceptance. In various embodiments, one or more subsequent machine learning models may be created from the one or more first machine learning models, and may be configured to analyze candidates and generate predictions therefor.

One or more secondary training datasets can be generated, for example, to support unsupervised (e.g., unlabeled) training or supervised (e.g., labeled) training. In at least one embodiment, the model service 209 generates a secondary training dataset that includes, for example, candidate and/or position data describing both known CCG-based and known non-CCG position holders. In various embodiments, the model service may generate a secondary training dataset including candidate and/or position data describing both known CCG-based position acceptors and known CCG-based position rejecters. In at least one embodiment, the second training dataset may be unlabeled (e.g., absent information that identifies position holders therein as CCG or non-CCG, or as a CCG-based position acceptor or rejecter). In one or more embodiments, one or more secondary machine learning models may be trained to predict, from the second training dataset, position holders that may be CCG-based. According to one embodiment, the one or more secondary machine learning models may generate a first set of predicted CCG-based position holders. In one or more embodiments, the one or more secondary machine learning models may be trained to predict, from the second training dataset, individuals that may be CCG-based position acceptors.

At step 312, the process 300 includes analyzing output from one or more training models. Analyzing the output can include, but is not limited to, comparing the output to an expected output and, based on the comparison, computing one or more accuracy or error metrics (also referred to as loss functions). In at least one embodiment, the model service 209 calculates one or more error metrics between machine-predicted output and corresponding known output (e.g., from the first training dataset). In various embodiments, and may reconfigure or modify the one or more secondary machine learning models to reduce the error metrics (e.g., thereby increasing accuracy and/or precision of subsequently generated predictions).

In at least one embodiment, the system may compare the first set of predicted CCG-based position holders to the known CCG-based position holder of the first training dataset and calculate one or more error metrics quantifying the comparison, thereby determining how accurately and precisely the one or more secondary machine learning models identified the CCG-based position holders. In at least one embodiment, the system may compare the first set of predicted CCG-based position acceptors to the known CCG-based position acceptors of the first training dataset and calculate one or more error metrics quantifying the comparison, thereby determining how accurately and precisely the one or more secondary machine learning models identified the CCG-based position acceptors.

At step 315, the process 300 includes determining that a predetermined threshold, such as an error or accuracy threshold, is met. In various embodiments, the system may repeat and iterate upon any training activities until one or more dynamic and/or predetermined error metric thresholds are met. In response to determining that the predetermined threshold is met, the process 300 can proceed to step 318. In response to determining that the predetermined threshold is not met, the process 400 can proceed to step At step 318, the process 300 includes storing the threshold-satisfying machine learning model. The machine learning model can be stored, for example, as model data 223, including, but not limited to, training datasets, error metrics, parameters, weight values, directionality assignments, and configuration settings.

Figure 4:
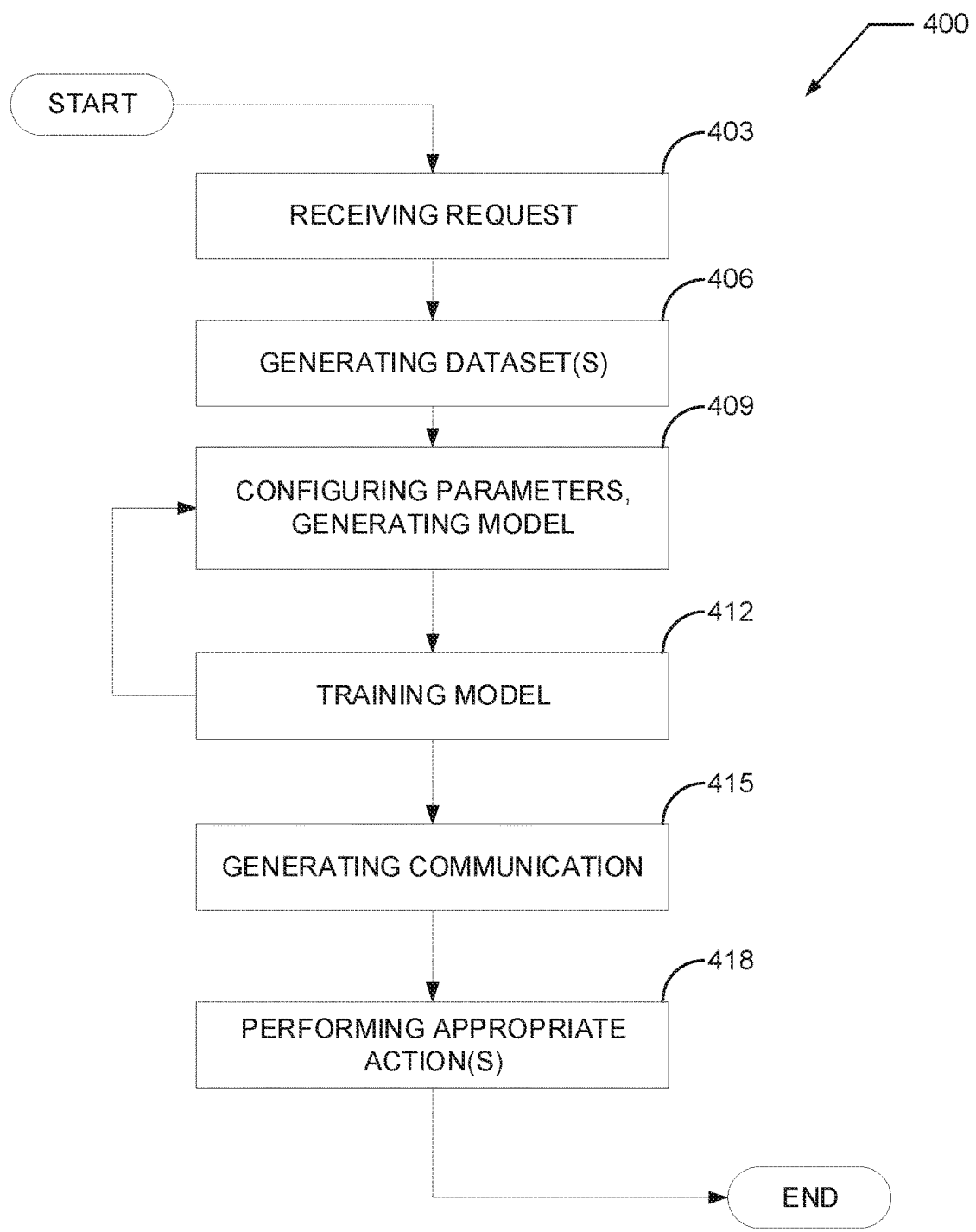
FIG. 4 shows an exemplary communication process, according to one embodiment of the present disclosure.

FIG. 4 shows an exemplary communication process 400, according to one embodiment of the present disclosure. In various embodiments, the communication process 400 is performed to generate, based on machine-learned results, strings of text for electronic communications with which a particular candidate (or set of candidates) is likely to engage (e.g., based on one or more aspects, analyses, and/or classifications of the particular candidate). At step 403, the process 400 includes receiving a request to initiate a communication. The request can be generated automatically or in response to an input. For example, the request is automatically initiated in response to performance of a prediction process or a machine learning process. In another example, the request is automatically initiated based on a predetermined schedule for contacting candidates, the predetermined schedule being retrieved from user data 215. The request can include identifications of one or more candidates for which communication is requested, such as, for example, profile names or other identifiers.

At step 406, the process 400 includes generating one or more datasets, such as, for example input datasets and training datasets. The dataset can be generated based at least in part on the request. For example, based on a particular candidate description or other factor provided in the request, historical communication language and associated outcomes can be retrieved and used to generate a training dataset. In the same example, based on a candidate description and classification, a corpus of communication language is generated via a natural language generation process and is used to generate an input dataset. In this example, the training dataset can be used to train a machine learning model for classifying communication language as more or less likely to elicit engagement and, based on the trained machine learning model, a second machine learning model can be generated to predict a likelihood of the corpus of communication (e.g., or a subset thereof) eliciting engagement when included in a communication to the candidate with which the candidate description is associated.

Generating the dataset can include retrieving, from one or more databases, recruitment language, candidate classifications, weight values, and/or parameters (e.g., candidate characteristics, metrics, etc.) with which the weight values are associated. According to one embodiment, recruitment language includes, but is not limited to, communication templates, subject lines, introductions, body paragraphs or sentences, and key terms. In at least one embodiment, the retrieved parameters can be parameters determined to be most positively or negatively influential for generating a classification of a candidate (e.g., such as a classification of a candidate as individual likely to be interested in a CCG position). In at least one embodiment, the recruitment language includes metadata, such as one or more historical parameters, prediction scores, weights and/or classifications. In one example the metadata includes a prediction score (e.g., generated from a machine learning process) that estimates a likelihood of the recruitment language in eliciting engagement. The metadata may include one or more historical parameters, prediction scores, weights and/or classifications. The system can process the retrieved language and metadata to create a training dataset of known inputs (e.g., language items, and the known parameters, prediction scores, impacts, and/or classifications) and known outcomes (e.g., optimal language and engagement scores).

At step 409, the process 400 includes configuring parameters and generating one or more machine learning models. The machine learning model can be configured to evaluate the known inputs of the training dataset and predict optimal recruitment language for inclusion in a communication to the candidate provided in the request. The machine learning model can generate optimal recruitment language (e.g., language items, and combinations of language items, which may be sourced from the retrieved recruitment language). The machine learning model can be configured to calculate and assign, to each instance of optimal language, one or more predicted engagement scores. As described herein, an engagement score can be a metric that estimates a likelihood that an instance or combination of optimal language item may elicit engagement from an associated candidate (e.g., when used to generate a communication for the candidate). In one or more embodiments, while generating the one or more machine learning models, the system may process weights received from a model training process (e.g., at step 412), and may weigh or evaluate each known input (or parameter produced therefrom) according to the weights.

At step 412, the process 400 includes training the one or more machine learning models. Training the machine learning model includes, for example, generating and analyzing output (e.g., including one or more recruitment language items). For example, the model service 209 generates a first version of a machine learning model that is configured to generate, from the known inputs of the training dataset, a set of optimal language items and predicted engagement scores. The model service 209 can compare the optimal language items and the predicted engagement scores to the known outcomes of the training dataset, and can calculate one or more error metrics between the machine-learned outcomes and the known outcomes. For example, the model service 209 compares each of the optimal language items and predicted engagement scores to analogous language items and engagement scores in the training dataset, and, based on the comparison, calculates an error metric for each optimal language item.

To minimize the one or more error metrics, the system can iteratively optimize the first version machine learning model into one or more secondary version machine learning models by, calculating and assigning a weight to one or more model parameters. Using the weighted model parameters, one or more additional machine learning models can be created and executed to generate one or more additional sets of machine-learned outcomes. The additional set of machine-learned outcomes can be compared to the known outcomes of the training dataset and the one or more error metrics can be recalculated. The value of one or more parameter weights can be adjusted (e.g., increased, decreased, or removed) to reduce the one or more error metrics. In one example, the model service 209 generates a ranked list of parameter weights based on associated error metric value. In this example, the model service 209 increases or decreases the value of one or more top-ranked parameter weights (e.g., which may result in a reduction of the corresponding error metric in subsequent machine learning processes). One or more secondary machine learning models can be generated generating (e.g., at step 404) additional machine learning models and machine-learned outcomes. In at least one embodiment, the system can combine one or more machine learning models to generate an ensemble machine learning model.

The system can iteratively repeat steps 409-412, thereby continuously training and/or combining the one or more machine learning models until a particular machine learning model demonstrates one or more error metrics below a predefined threshold, or demonstrates an accuracy and/or precision at or above one or more predefined thresholds. The system can also process new known outcomes over time. As an example, unknown outcomes may become known outcomes when a candidate decides whether to respond to an email, perform a job interview, or accept a job position. The actual outcome for the job candidate can be fed back into the system to continually improve model training towards generating communications that are more likely to elicit engagement.

At step 415, upon determining that the particular machine learning model satisfies an error metric, accuracy, and/or precision threshold, the particular machine learning model is executed on input including a testing dataset (e.g., generated at step 402). The particular machine learning model can predict, for each candidate of the testing dataset, engagement scores that can be used one or more language items based on likelihood to elicit engagement. The model service 209 can rank the optimal language items based on the predicted engagement scores and can provide top-ranked optimal language items (e.g., items with the highest predicted engagement scores) as language inputs to one or more natural language generation algorithms, or the like. In at least one embodiment, a predicted engagement threshold is retrieved, and the communication service 211 selects language inputs (to the natural language generation algorithms) by comparing each predicted engagement score to the predicted engagement threshold, and selecting optimal language items whose predicted engagement score satisfies the predicted engagement threshold.

The communication service 211 can execute one or more natural language algorithms to process the language inputs and generate optimal recruitment language. The optimal recruitment language can include, but is not limited to, subject lines, body sentences and/or paragraphs, introductions, and other linguistic structures and/or patterns for use in recruitment communications. In at least one embodiment, the one or more natural language algorithms may receive and process one or more language preferences that designate a particular format for generated optimal recruitment language. For example, the one or more natural language algorithms can receive and process a language preference for subject lines, and, accordingly, can generate only optimal recruitment language for subject lines.

At step 418, one or more appropriate actions are performed, such as, for example, storing one or more communications, transmitting one or more communications, or rendering a communication on a computing device 205. In one example, the communication service 211 automatically generates an electronic message based on the optimal recruitment language and transmits the electronic message to an associated candidate or to a user account that requested analysis of the candidate. Transmission can be performed based at least in part on include one or more transmission parameters from a user account. In one example, the communication service 211 retrieves user data 215 with which a request is associated and extracts a transmission parameter for scheduling communications to be automatically transmitted at a particular time and date or at a particular frequency. In this example, the transmission parameter causes the communication service 211 to transmit an electronic communication at the beginning of a work week and, accordingly, communication service 211 queues the electronic communication to be transmitted on the coming Monday morning.

In at least one embodiment, the computing environment 201 is configured to monitor transmitted communications (and responses thereto) to determine effectiveness of the transmitted communications. For example, the computing environment 201 can determine if a particular candidate engaged with a transmitted communication. In this example, in response to determining that engagement occurred, the communication service 211 can retrieve communication content including, but not limited to, subject lines, communication content, timestamps, and transmission parameters, and the retrieved communication content can be labeled as a positive outcome. The labeled communication content can be stored and retrieved to generate training datasets for training machine learning models. In another example, the computing environment 201 determines that a particular electronic communication did not elicit engagement. In this example, the communication service labels communication content associated with the electronic communication as a negative outcome.

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable non-volatile memories such as secure digital (SD), flash memory, memory stick, etc., or any other medium which can be used to carry or store computer program code in the form of computer-executable instructions or data structures and which can be accessed by a general purpose computer, special purpose computer, specially-configured computer, mobile device, etc.

When information is transferred or provided over a network or another communications connection (either hardwired, wireless, or a combination of hardwired or wireless) to a computer, the computer properly views the connection as a computer-readable medium. Thus, any such connection is properly termed and considered a computer-readable medium. Combinations of the above should also be included within the scope of computer-readable media. Computer-executable instructions comprise, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the disclosure may be implemented. Although not required, some of the embodiments of the claimed systems may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed system are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the systems are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the system is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed systems will be readily discernible from the description herein, by those of ordinary skill in the art. Many embodiments and adaptations of the disclosure and claimed systems other than those herein described, as well as many variations, modifications, and equivalent arrangements and methodologies, will be apparent from or reasonably suggested by the disclosure and the foregoing description thereof, without departing from the substance or scope of the claims. Furthermore, any sequence (s) and/or temporal order of steps of various processes described and claimed herein are those considered to be the best mode contemplated for carrying out the claimed systems. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed systems. In addition, some steps may be carried out simultaneously, contemporaneously, or in synchronization with other steps.

Aspects, features, and benefits of the claimed devices and methods for using the same will become apparent from the information disclosed in the exhibits and the other applications as incorporated by reference. Variations and modifications to the disclosed systems and methods may be effected without departing from the spirit and scope of the novel concepts of the disclosure.

It will, nevertheless, be understood that no limitation of the scope of the disclosure is intended by the information disclosed in the exhibits or the applications incorporated by reference; any alterations and further modifications of the described or illustrated embodiments, and any further applications of the principles of the disclosure as illustrated therein are contemplated as would normally occur to one skilled in the art to which the disclosure relates.

The foregoing description of the exemplary embodiments has been presented only for the purposes of illustration and description and is not intended to be exhaustive or to limit the devices and methods for using the same to the precise forms disclosed. Many modifications and variations are possible in light of the above teaching.

The embodiments were chosen and described in order to explain the principles of the devices and methods for using the same and their practical application so as to enable others skilled in the art to utilize the devices and methods for using the same and various embodiments and with various modifications as are suited to the particular use contemplated. Alternative embodiments will become apparent to those skilled in the art to which the present devices and methods for using the same pertain without departing from their spirit and scope. Accordingly, the scope of the present devices and methods for using the same is defined by the appended claims rather than the foregoing description and the exemplary embodiments described therein.

What is claimed is:

1. A machine learning process comprising:
   training, with a primary training set, a first machine learning algorithm to identify a difference between known contract, contingent, or gig (CCG)-based position holders and known non-CCG-based position holder;
   identifying, via the first machine learning algorithm, a parameter based on the differences identified;
   generating, via the first machine learning algorithm, a weight for the identified parameter such that the weight corresponds to a positive or negative indication of a likelihood that a first candidate is a CCG-based position holder;
   generating a second machine learning algorithm based on the weight generated by the first learning algorithm to predict a likelihood of a second candidate as being a CCG-based position holder;
   generating a secondary training set including known CCG-based position holders and known non-CCG-based position holders;
   generating, via the at least one second machine learning algorithm, one or more machine-learned results;
   improving accuracy of the second machine learning algorithm with the secondary training set by reconfiguring the second machine learning algorithm to reduce an error metric based on a comparison between the one or more machine-learned results and known results;
   receiving a description of one or more candidates;
   generating, via the at least one second machine learning algorithm, a respective likelihood of interest in a CCG class of positions for each of the one or more candidates; and
   generating a respective communication to each of a subset of the one or more candidates open to the respective likelihood of interest in the CCG class of positions for the subset above a threshold.

2. The machine learning process of claim 1, further comprising:
   receiving a set of candidate parameters for a particular position, the particular position corresponding to the CCG class of positions; and
   processing the set of candidate parameters to identify one or more candidates from a set of candidates that meet the set of candidate parameters.

3. The machine learning process of claim 1, further comprising:
   generating a ranking of the subset of the one or more candidates based on the respective likelihood of interest in the CCG class of positions; and
   generating a communication based on the ranking of the subset.

4. The machine learning process of claim 1, further comprising:
   generating particular language designed to provoke a response from each of the subset of the one or more candidates; and
   generating one or more strings of text via natural language processing for the respective communication for each of the subset of the one or more candidates, wherein the one or more strings of text comprise language are based on the particular language.

5. The machine learning process of claim 1, wherein the primary training set describes one or more first communications with a known positive result and one or more second communications with a known negative result.

6. The machine learning process of claim 1, further comprising:
   receiving an indication that a particular candidate of the one or more candidates does not prefer the CCG class of positions;
   subsequent to receiving the indication, generating a change in a profile associated with the particular candidate;
   generating that the change in the profile increases a likelihood of interest in the CCG class of positions more than or equal to a threshold amount; and
   in response to the change increasing the likelihood of interest more than or equal to the threshold amount, adjusting the profile to facilitate communication with the particular candidate.

7. The machine learning process of claim 1, wherein the description of the one or more candidates is extracted from at least one of media and investigative information.

8. A machine learning system comprising:
   memory comprising a primary training set describing one or more first communications with a known positive result and one or more second communications with a known negative result; and
   at least one device in communication with the memory, the at least one device being configured to:
   train, with a primary training set, at least one first machine learning algorithm to identify a difference between known contract, contingent, or gig (CCG)-based position holders and known non-CCG-based position holder;
   identify, via the at least one first machine learning algorithm, a parameter based on the differences identified;
   analyze, via the at least one first machine learning algorithm, a weight for the identified parameter such that the weight corresponds to a positive or negative indication of a likelihood that a first candidate is a CCG-based position holder;
   generate at least one second machine learning algorithm based on the weight analyzed by the first learning algorithm predict a likelihood of a second candidate as being a CCG-based position holder;
   generate a secondary training set including known CCG-based position holders and known non-CCG-based position holders;
   generate, via the at least one second machine learning algorithm, one or more machine-learned results;
   improve accuracy of the at least one second machine learning algorithm with the secondary training set by reconfiguring the at least one second machine learning algorithm to reduce an error metric based on a comparison between the one or more machine-learned results and known results; and analyze, via the at least one second machine learning algorithm, a respective likelihood of interest in a CCG class of positions for each of the one or more candidates.

9. The machine learning system of claim 8, wherein the at least one device is further configured to exclude any candidates from the one or more candidates that does not meet a predefined threshold.

10. The machine learning system of claim 8, wherein the at least one device is further configured to generate a respective communication to each of a subset of the one or more candidates open to the respective likelihood of interest in the CCG class of positions for the subset above a threshold.

11. The machine learning system of claim 10, wherein the at least one device is further configured to:

analyze a respective result associated with the respective communication for each of the subset of the one or more candidates; and transform the primary training set based on the respective result for each of the subset of the one or more candidates.

12. A machine learning system comprising:

memory; and at least one device in communication with the memory, the at least one device being configured to:

train, with a primary training set, at least one first machine learning algorithm to identify a difference between known contract, contingent, or gig (CCG)-based position holders and known non-CCG-based position holder;

analyze via the at least one first machine learning algorithm, a weight for the identified parameter such that the weight corresponds to a positive or negative indication of a likelihood that a first candidate is a CCG-based position holder;

generate at least one second machine learning algorithm based on the weight analyzed by the first learning algorithm to predict a likelihood of a second candidate as being a CCG-based position holder;

generate a secondary training set including known CCG-based position holders and known non-CCG-based position holders;

generate, via the at least one second machine learning algorithm, one or more machine-learned results;

improve accuracy of the at least one second machine learning algorithm with the secondary training set by reconfiguring the at least one second machine learning algorithm to reduce an error metric based on a comparison between the one or more machine-learned results and known results;

analyze, via the at least one second machine learning algorithm, a respective likelihood of interest in a CCG class of positions for each of one or more candidates; and generate a respective communication to each of a subset of the one or more candidates open to the respective likelihood of interest in the CCG class of positions for the subset above a threshold.

13. The machine learning system of claim 12, wherein the at least one device is further configured to:

analyze a respective result associated with the respective communication for each of the subset of the one or more candidates; and transform the primary training set based on the respective result for each of the subset of the one or more candidates.

14. The machine learning system of claim 13, wherein the at least one device is further configured to:

transform, with the transformed primary training set, the at least one first machine learning algorithm to generate a transformed one or more machine predicted results; and analyze one or more transformed weights based on the transformed one or more machine predicted results and the transformed teaching set.

15. The machine learning system of claim 14, wherein the at least one device is further configured to:

generate at least one transformed second machine learning algorithm based on the one or more transformed weights;

generate, via the at least one transformed second machine learning algorithm, one or more additional machine-learned results; and identify a transformed respective likelihood of interest in the CCG class of positions for each of the one or more candidates based on the one or more additional machine-learned results.

16. The machine learning system of claim 12, wherein the at least one device is further configured to:

receive a set of candidate parameters for a particular position, the particular position corresponding to the CCG class of positions; and process the set of candidate parameters to identify a candidate subset of the one or more candidates that meets the set of candidate parameters, wherein the subset of the one or more candidates are selected from the candidate subset.

17. The machine learning system of claim 12, wherein the at least one device is further configured to:

receive the respective likelihood of interest in the CCG class of positions for the one or more candidates;

analyze, for each candidate, if the respective likelihood of interest for a subset of the one or more candidates meets a threshold for a particular position; and generate and transmit, to a profile associated with the particular position, a description of the subset of the one or more candidates that meet the threshold.

18. The machine learning system of claim 12, wherein the at least one device is further configured to exclude any candidates from the one or more candidates that does not meet a predefined threshold.

* * * * *